US007050386B2

(12) United States Patent
Ueda

(10) Patent No.: US 7,050,386 B2
(45) Date of Patent: May 23, 2006

(54) OPTICAL RECORDING MEDIUM AND MISALIGNMENT MEASURING INSTRUMENT

(75) Inventor: Eiji Ueda, Yawata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 364 days.

(21) Appl. No.: 10/333,059

(22) PCT Filed: Aug. 29, 2001

(86) PCT No.: PCT/JP01/07443

§ 371 (c)(1),
(2), (4) Date: Jan. 14, 2003

(87) PCT Pub. No.: WO02/19323

PCT Pub. Date: Mar. 7, 2002

(65) Prior Publication Data

US 2004/0100887 A1    May 27, 2004

(30) Foreign Application Priority Data

Aug. 31, 2000  (JP)  .............................. 2000-263052

(51) Int. Cl.
G11B 7/007 (2006.01)

(52) U.S. Cl. ............................. 369/275.4; 369/44.26; 369/53.23; 369/275.3

(58) Field of Classification Search ............. 369/275.4, 369/275.3, 44.13, 44.26, 44.28, 44.34, 44.36, 369/47.35, 47.21, 47.34, 47.31, 53.37, 47.1, 369/53.23

See application file for complete search history.

(56) References Cited

U.S. PATENT DOCUMENTS

| 4,707,816 | A | * | 11/1987 | Yonezawa et al. | ........ | 369/44.13 |
| 4,866,688 | A | * | 9/1989 | Ohtake et al. | ............ | 369/44.13 |
| 5,063,546 | A | | 11/1991 | Ito et al. | .................... | 369/275.3 |
| 5,459,710 | A | * | 10/1995 | Hoshino et al. | .......... | 369/47.31 |
| 5,815,485 | A | * | 9/1998 | Tanaka et al. | ............ | 369/275.3 |
| 5,859,820 | A | * | 1/1999 | Nagasawa et al. | ........ | 369/47.35 |
| 6,118,752 | A | * | 9/2000 | Miyagawa et al. | ....... | 369/275.3 |
| 6,128,272 | A | * | 10/2000 | Horimai et al. | ........... | 369/44.26 |
| 6,628,578 | B1 | * | 9/2003 | Nakamura et al. | ........ | 369/44.26 |

FOREIGN PATENT DOCUMENTS

| JP | 63-225924 | 9/1988 |
| JP | 63-281006 | 11/1988 |
| JP | 01-223634 | 9/1989 |

* cited by examiner

Primary Examiner—William Korzuch
Assistant Examiner—Kim-Kwok Chu
(74) Attorney, Agent, or Firm—Hamre, Schumann, Mueller & Larson, P.C.

(57) ABSTRACT

To provide an optical recording medium and an eccentricity amount detecting device using the same that can detect an eccentricity amount representing a relative displacement amount in a radiation direction between a beam spot irradiated onto the optical recording medium and the optical recording medium. In the optical recording medium, a plurality (N) of servo areas (113) each including a first wobble mark (211) and a second wobble mark (212) and a plurality (N) of data areas for performing information recording and reproduction are arranged alternatively in a circumferential direction. Each of the servo areas is composed of a plurality of servo pattern areas (210a to 210c) arranged in the radial direction, which vary in a distance in the circumferential direction between the first wobble mark and the second wobble mark. The plurality of servo pattern areas include the same number of tracks, and the number is less than $N/(2 \times \pi)$.

14 Claims, 20 Drawing Sheets

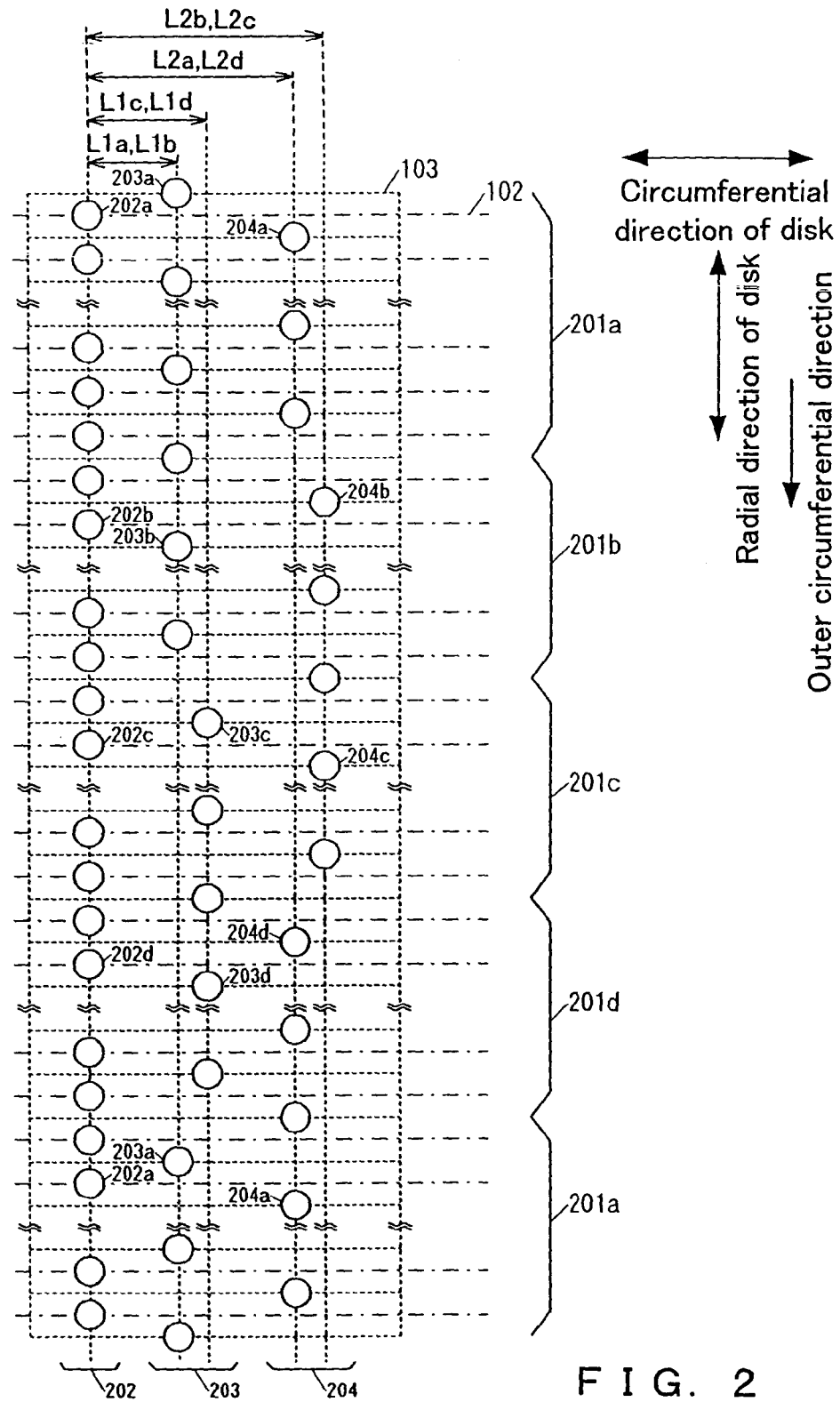
F I G. 2

|      | W1-1 | W1-2 | Space | W2-1 | W2-2 |
|------|------|------|-------|------|------|
| 10 Track AB | Pit |     |       | Pit  |      |
| 10 Track AB |     | Pit |       | Pit  |      |
| 10 Track AB |     | Pit |       |      | Pit  |
| 10 Track AB | Pit |     |       |      | Pit  |

FIG. 4

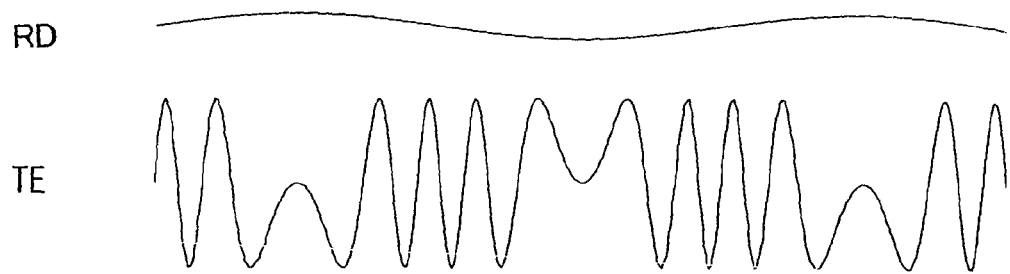
F I G. 10
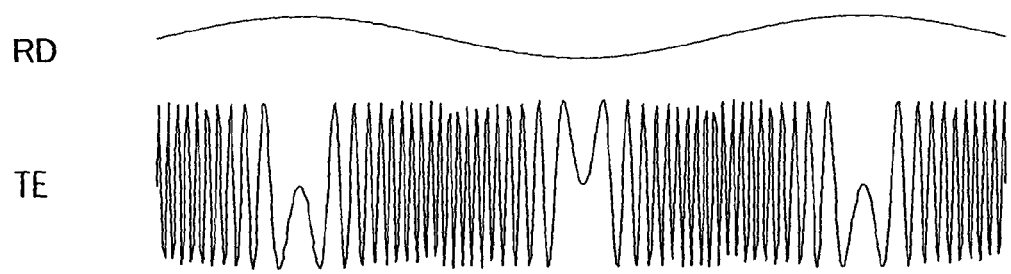
F I G. 11
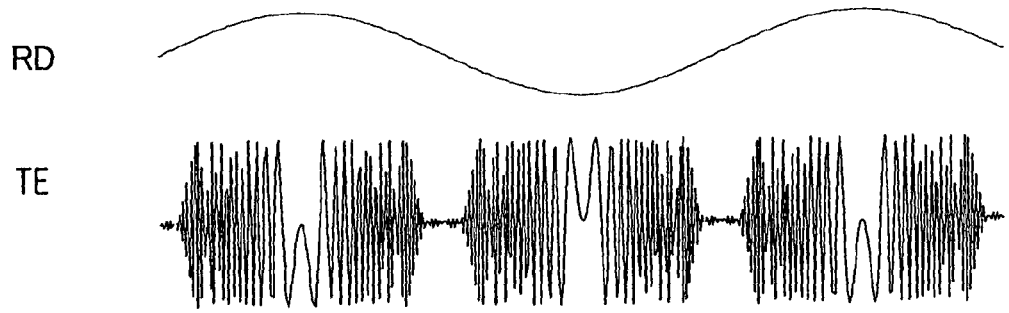
F I G. 12

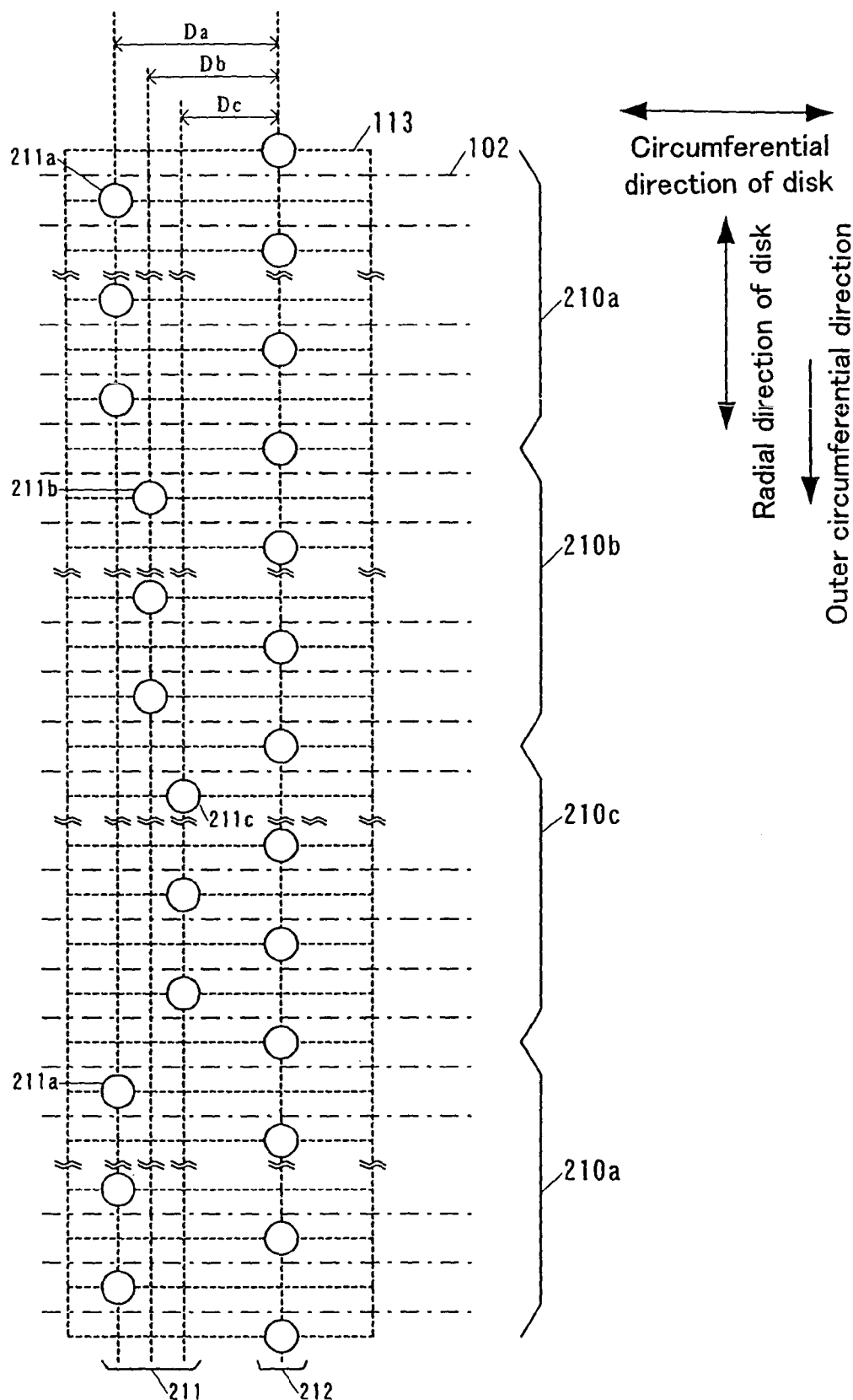
F I G. 15

US 7,050,386 B2

OPTICAL RECORDING MEDIUM AND MISALIGNMENT MEASURING INSTRUMENT

TECHNICAL FIELD

The present invention relates to an optical recording medium with respect to which data recording/reproduction is performed using light, and an eccentricity amount detecting device using the optical recording medium.

BACKGROUND ART

In recent years, optical recording media have been put to wide and practical use in the forms of, for example, a CD and a DVD, as media for storing music and images. For further expansion of the field of application, such optical media have been undergoing improvements in capacity and performance.

Hereinafter, an example of a conventional optical recording medium will be described with reference to appended drawings.

FIG. 23 is a schematic diagram showing an example of a conventional optical recording medium. In FIG. 23, servo areas 1403 and data areas 1404 are formed along a spiral track center line 1402 (only a part thereof is shown in FIG. 23) on a conventional optical recording medium 1401.

FIG. 24 shows the respective configurations of the servo area 1403 and the data area 1404. As shown in FIG. 24, a clock mark 1501, a first wobble mark 1502 and a second wobble mark 1503 are formed at a predetermined distance from each other in the servo area 1403.

Furthermore, in the data area 1404, information is recorded substantially on the track center line 1402. The clock mark 1501 is used for generating a synchronizing clock signal used to reproduce the first wobble mark 1502, the second wobble mark 1503 and information recorded in the data areas 1404.

The track center line 1402 is a virtual line obtained by sequentially connecting the respective centers of the clock marks 1501.

The first wobble mark 1502 and the second wobble mark 1503 are formed respectively in positions shifted in opposite directions by a predetermined distance in the radial direction with respect to the track center line 1402, and are used to detect a tracking error signal corresponding to a positional shift of a beam spot irradiated onto the optical recording medium 1401 from the track center line 1402.

When the beam spot is shifted from the track center line 1402, one of the light beams reflected from the first wobble mark 1502 and the second wobble mark 1503 becomes larger than the other reflected light beam, and thus a tracking error signal can be detected.

In the optical recording medium 1401 with the above-described configuration, a tracking error signal is detected with reference to the synchronizing clock signal generated based on the clock mark 1501.

With the use of the tracking error signal, tracking control is performed so that the beam spot on the optical recording medium 1401 scans the information recorded on the date area 1404 accurately, and thus information recording or reproduction can be performed.

However, in the above-described configuration, a tracking error signal is obtained in a discrete manner, and thus the following problem arises. That is, when an eccentricity amount representing a relative displacement amount in a radial direction between an optical recording medium and a beam spot irradiated onto the optical recording medium is small, the eccentricity amount can be measured based on the tracking error signal; however, when the eccentricity amount is large, a tracking signal cannot be detected accurately, and thus the eccentricity amount cannot be measured.

As a result, an eccentricity amount correction operation cannot be performed, thereby making it difficult to perform a pull-in operation of tracking control or the like, which has been disadvantageous.

JP 63(1988)-225924 A discloses an optical disk as a measure to solve the above-mentioned problem. That is, "the optical disk is characterized in that a distance between at least one pit of a pair of wobble pits and a clock pit as a reference pit to information data varies between at least three predetermined distances, and the distance is changed in a predetermined order repeatedly for every at least one information track", thereby allowing the above-mentioned problem to be solved.

According to this configuration, an eccentricity amount representing a relative displacement amount in a radial direction between an optical recording medium and a beam spot irradiated onto the optical recording medium can be detected.

Thus, an eccentricity amount correction operation can be performed, thereby allowing a stable pull-in operation of tracking control or the like to be realized.

However, it has been revealed that, in the above-mentioned conventional optical recording medium, when detecting a direction of a relative movement in the radial direction between the optical recording medium and the beam spot irradiated onto the optical recording medium, a detection error may occur depending on how the wobble marks are arranged. This has led to the problem of the deterioration in accessing accuracy.

DISCLOSURE OF THE INVENTION

With the foregoing in mind, it is an object of the present invention to provide an information recording medium and an eccentricity amount detecting device that enables accurate detection of an eccentricity amount representing a relative movement amount in a radial direction between a beam spot irradiated onto the optical recording medium and the optical recording medium.

In order to achieve the above-mentioned object, in a first optical recording medium according to the present invention, a plurality (N) of servo areas are arranged in a circumferential direction, and a plurality of servo pattern areas having different patterns are arranged in a radial direction.

In the medium, the plurality of servo pattern areas include the same number of tracks, and the number is less than $N/(2 \times \pi)$ ($\pi$ indicates a ratio of circumference to diameter).

In order to achieve the above-mentioned object, in a second optical recording medium according to the present invention, a plurality (N) of servo areas each including a clock mark, a first wobble mark and a second wobble mark, and a plurality (N) of data areas for performing information recording and reproduction are arranged alternately in a circumferential direction. In the medium, each of the servo areas is composed of a plurality of servo pattern areas arranged in a radial direction, which vary in a distance in the circumferential direction between the clock mark and the first wobble mark, and a distance in the circumferential direction between the clock mark and the second wobble mark. The plurality of servo pattern areas include the same number of tracks, and the number is less than $N/(2 \times \pi)$.

In order to achieve the above-mentioned object, in a third optical recording medium according to the present invention, a plurality (N) of servo areas each including a first wobble mark and a second wobble mark and a plurality (N) of data areas for performing information recording and reproduction are arranged alternately in a circumferential direction. In the medium, each of the servo areas is composed of a plurality of servo pattern areas arranged in a radial direction, which vary in a distance in the circumferential direction between the first wobble mark and the second wobble mark. The plurality of servo pattern areas include the same number of tracks, and the number is less than $N/(2\times\pi)$ ($\pi$ indicates a ratio of circumference to diameter).

According to the above-described first to third optical recording media, even when a frequency (track crossing frequency) at which a beam spot crosses a track center line becomes higher than sampling frequencies (frequencies at which the first and second wobble marks are reproduced) for generating a tracking error signal, an eccentricity amount can be detected accurately.

Furthermore, according to the third optical recording medium, since the first wobble mark or the second wobble mark functions as the clock mark in the second optical recording medium, the number of groups of marks formed in the radial direction can be less by one than that in the second optical recording medium. Thus, in the circumferential direction, each of the servo areas can be reduced in size, so that an area of each of the data areas can be increased, thereby allowing a data recording capacity to be increased.

In the second and third optical recording media, preferably, the servo areas have substantially a uniform length in the circumferential direction regardless of a radius.

According to this configuration, an area ratio of the servo areas in an outer circumferential portion can be reduced, and an area of the data areas can be increased correspondingly, thereby allowing the data recording capacity to be increased.

Furthermore, in the second optical recording medium, preferably, the servo pattern areas adjacent to each other among the plurality of servo pattern areas are substantially equal in one of the distance in the circumferential direction between the clock mark and the first wobble mark and the distance in the circumferential direction between the clock mark and the second wobble mark.

According to this configuration, even when a beam spot passes the vicinity of a boundary between the servo pattern areas, information in either one of the adjacent servo pattern areas can be obtained, thereby allowing a detecting operation to be performed accurately.

Furthermore, preferably, the second optical recording medium has the following configuration. That is, the plurality of servo pattern areas are composed of a first servo pattern area, a second servo pattern area, a third servo pattern area, and a fourth servo pattern area. The first servo pattern area and the second servo pattern area are substantially equal in the distance in the circumferential direction between the clock mark and the first wobble mark. The second servo pattern area and the third servo pattern area are substantially equal in the distance in the circumferential direction between the clock mark and the second wobble mark. The third servo pattern area and the fourth servo pattern area are substantially equal in the distance in the circumferential direction between the clock mark and the first wobble mark. The fourth servo pattern area and the first servo pattern area are substantially equal in the distance in the circumferential direction between the clock mark and the second wobble mark.

According to this configuration, a relative movement amount and a moving direction in a radial direction between a beam spot irradiated onto an optical recording medium and the optical recording medium can be detected by using a simplified circuit configuration.

In order to achieve the above-mentioned object, a first eccentricity amount detecting device according to the present invention includes the first optical recording medium, a sensor that detects reflected light from the optical recording medium, a direction detecting means that detects a direction of a relative movement in the radial direction between a position on the optical recording medium and a beam spot focused by an objective lens based on a detection signal from the sensor and outputs a result thus obtained as a direction detection signal, a pattern counting means that counts changes of the servo pattern areas based on the detection signal from the sensor and the direction detection signal from the direction detecting means, and an eccentricity amount computing means that determines an eccentricity amount based on a count value from the pattern counting means.

In order to achieve the above-mentioned object, a second eccentricity amount detecting device according to the present invention includes the second optical recording medium, a sensor that detects reflected light from the optical recording medium, a direction detecting means that detects a direction of a relative movement in the radial direction between a position on the optical recording medium and a beam spot focused by an objective lens based on a detection signal from the sensor and outputs a result thus obtained as a direction detection signal, a pattern counting means that counts changes of the servo pattern areas based on the detection signal from the sensor and the direction detection signal from the direction detecting means, and an eccentricity amount computing means that determines an eccentricity amount based on a count value from the pattern counting means.

In order to achieve the above-mentioned object, a third eccentricity amount detecting device according to the present invention includes the third optical recording medium, a sensor that detects reflected light from the optical recording medium, a direction detecting means that detects a direction of a relative movement in the radial direction between a position on the optical recording medium and a beam spot focused by an objective lens based on a detection signal from the sensor and outputs a result thus obtained as a direction detection signal, a pattern counting means that counts changes of the servo pattern areas based on the detection signal from the sensor and the direction detection signal from the direction detecting means, and an eccentricity amount computing means that determines an eccentricity amount based on a count value from the pattern counting means.

Preferably, each of the first to third eccentricity amount detecting devices has the following configuration. That is, the direction detecting means includes a pattern judging means that judges a type of the servo pattern area, and a direction determining means that detects the direction of the relative movement in the radial direction between the position on the optical recording medium and the beam spot focused by the objective lens according to a result of the judgment by the pattern judging means.

Furthermore, preferably, each of the first to third eccentricity amount detecting devices has the following configuration. That is, the pattern counting means performs addition or subtraction with respect to a number of the changes of the servo pattern areas according to a result of the detection by the direction detecting means and outputs the count value.

Furthermore, preferably, each of the first to third eccentricity amount detecting devices has the following configuration. That is, the eccentricity amount computing means multiplies the count value from the pattern counting means by a value corresponding to the number of tracks included in one servo pattern area, thereby determining the eccentricity amount.

According to each of the first to third eccentricity amount detecting devices, an eccentricity amount representing a relative movement amount in a radial direction between a beam spot irradiated onto an optical recording medium and the optical recording medium can be detected accurately, thereby allowing a pull-in operation of tracking control or the like to be highly stabilized.

BRIEF DESCRIPTION OF THE DRAWINGS

FIG. 2 is a schematic plan view of a servo area 103 in a radial direction of the optical recording medium shown in FIG. 1.

FIG. 4 is a diagram showing an example of how the wobble marks are arranged in the servo area 103 on the optical recording medium shown in FIG. 1.

FIG. 10 is a waveform chart showing a displacement amount and a tracking error signal TE when the displacement amount is small.

FIG. 11 is a waveform chart showing a displacement amount and a tracking error signal TE when the displacement amount is somewhat large.

FIG. 12 is a waveform chart showing a displacement amount and a tracking error signal TE when the displacement amount is large.

FIG. 15 is a schematic plan view showing a servo area 103 in a radial direction of the optical recording medium shown in FIG. 14.

BEST MODE FOR CARRYING OUT THE INVENTION

Hereinafter, the present invention will be described by way of embodiments with reference to the appended drawings.

Embodiment 1

In Embodiment 1, the description is directed to an example of an optical recording medium according to the present invention.

Figure 1:
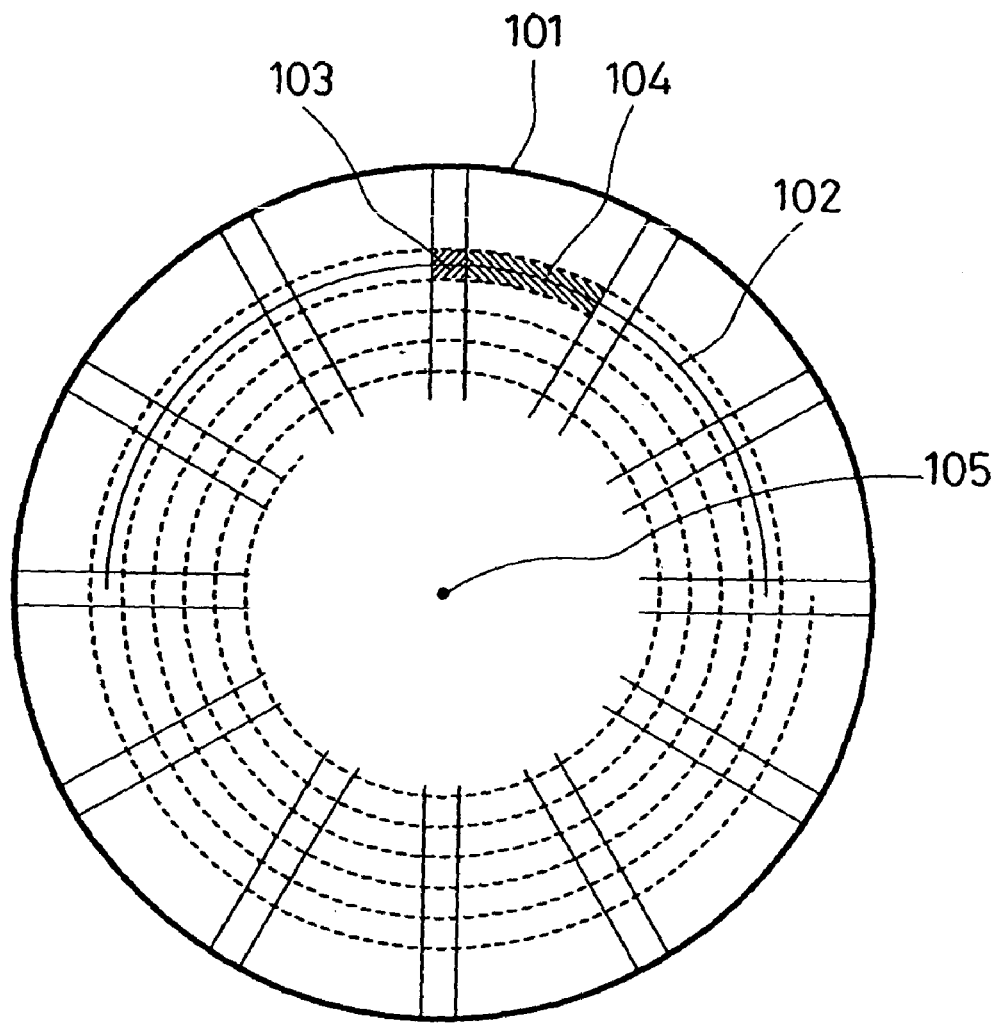
FIG. 1 is a schematic plan view showing an example of a configuration of an optical recording medium according to Embodiment 1 of the present invention.

FIG. 1 is a schematic plan view showing a configuration of an optical recording medium 101 according to Embodiment 1 of the present invention.

In FIG. 1, the optical recording medium 101 is in the shape of a disk on which a virtual track center line 102 (only a part thereof is shown in FIG. 1) is provided spirally. A servo area 103 and a data area 104 are arranged alternately in a disk circumferential direction on the optical recording medium 101. The data area 104 is used for information recording and reproduction. The number of each of the servo areas 103 and the data areas 104 that are arranged is N (N is an integer of not less than 500; herein, it is assumed to be 1,280).

A disk center 105 shown in FIG. 1 is a virtual point positioned at a center of the disk-shaped optical recording medium 101.

The track center line 102 is a virtual line along which a beam spot should travel when data recorded on the optical recording medium 101 is read out.

FIG. 2 is a schematic plan view showing the servo area in a radial direction of the optical recording medium 101.

In FIG. 2, the servo area 103 includes a clock mark 202, a first wobble mark 203 and a second wobble mark 204. Each of the clock marks 202 is formed on the track center line 102 and used to generate a synchronizing clock signal used for reproducing the first wobble mark 203, the second wobble mark 204 and information recorded in the data area 104.

The first wobble mark 203 and the second wobble mark 204 are used to detect a tracking error and arranged respectively in positions shifted in opposite directions by interposing the track center line 102 between them. In the optical recording medium 101 according to Embodiment 1, a distance in a circumferential direction between the clock mark 202 and the first wobble mark 203 and a distance in the circumferential direction between the clock mark 202 and the second wobble mark 204 vary according to a distance in the radial direction from the disk center 105.

The servo area 103 is composed of a plurality of servo pattern areas having different patterns of wobble mark arrangement. The plurality of servo pattern areas are arranged in order repeatedly in the radial direction, and are different from each other in at least one of the distance in the circumferential direction between the clock mark 202 and the first wobble mark 203 and the distance in the circumferential direction between the clock mark 202 and the second wobble mark 204.

As shown in FIG. 2, the servo area 103 is composed of four types of servo pattern areas, namely a first servo pattern area 201a, a second servo pattern area 201b, a third servo pattern area 201c and a fourth servo pattern area 201d.

The first servo pattern area 201a, the second servo pattern area 201b, the third servo pattern area 201c and the fourth servo pattern area 201d are arranged in order repeatedly in the radial direction.

The first servo pattern area 201a is formed in the radial direction across n1 tracks (n1 is sufficiently small compared with N/(2×π) and is an integer not less than 5; herein, n1 is assumed to be 20; and only a part of the n1 tracks is shown in FIG. 2). The second servo pattern area 201b is formed in the radial direction across n2 tracks (n2 is sufficiently small compared with N/(2×π) and is an integer not less than 5; herein, n2 is assumed to be 20; and only a part of the n2 tracks is shown in FIG. 2). The third servo pattern area 201c is formed in the radial direction across n3 tracks (n3 is sufficiently small compared with N/(2×π) and is an integer not less than 5; herein, n3 is assumed to be 20; and only a part of the n3 tracks is shown in FIG. 2). The fourth servo pattern area 201d is formed in the radial direction across n4 tracks (n4 is sufficiently small compared with N/(2×π) and is an integer not less than 5; herein n4 is assumed to be 20; and only a part of the n4 tracks is shown in FIG. 2).

Herein, n1, n2, n3 and n4 are assumed to have the same value.

The first servo pattern area 201a includes a clock mark 202a, a first wobble mark 203a and a second wobble mark 204a. The second servo pattern area 201b includes a clock mark 202b, a first wobble mark 203b and a second wobble mark 204b. The third servo pattern area 201c includes a clock mark 202c, a first wobble mark 203c and a second wobble mark 204c. The fourth servo pattern area 201d includes a clock mark 202d, a first wobble mark 203d and a second wobble mark 204d.

The first, second, third and fourth servo pattern areas 201a, 201b, 201c and 201d are different from each other in at least one of the distance in the circumferential direction between the clock mark 202 and the first wobble mark 203 and the distance in the circumferential direction between the clock mark 202 and the second wobble mark 204.

Furthermore, the servo pattern areas adjacent to each other in the radial direction among the first, second, third and fourth servo pattern areas 201a, 201b, 201c and 201d are substantially equal in one of the distance in the circumferential direction between the clock mark 202 and the first wobble mark 203 and the distance in the circumferential direction between the clock mark 202 and the second wobble mark 204.

Specifically, for example, as shown in FIG. 2, distances L1a, L1b, L1c and L1d in the circumferential direction between the respective pairs of the clock mark 202 and the first wobble mark 203 in the first, second, third and fourth servo pattern areas 201a, 201b, 201c and 201d and distances L2a, L2b, L2c and L2d in the circumferential direction between the respective pairs of the clock mark 202 and the second wobble mark 204 in the respective servo areas have the following relationship.

That is, the first servo pattern area 201a and the second servo pattern area 201b are substantially equal in the distance in the circumferential direction between the clock mark 202 and the first wobble mark 203 (L1a≈L1b). Further, the second servo pattern area 201b and the third servo pattern area 201c are substantially equal in the distance in the circumferential direction between the clock mark 202 and the second wobble mark 204 (L2b≈L2c). Further, the third servo pattern area 201c and the fourth servo pattern area 201d are substantially equal in the distance in the circumferential direction between the clock mark 202 and the first wobble mark 203 (L1c≈L1d). Further, the first servo pattern area 201a and the fourth servo pattern area 201d are substantially equal in the distance in the circumferential direction between the clock mark 202 and the second wobble mark 204 (L2a≈L2d).

In the above-mentioned optical recording medium 101, a relative movement amount and a moving direction in the radial direction between a beam spot irradiated onto the optical recording medium and the optical recording medium can be detected.

Furthermore, in the above-mentioned optical recording medium 101, the servo pattern areas adjacent to each other in the radial direction are substantially equal in one of the distance in the circumferential direction between the cock mark 202 and the first wobble mark 203 and the distance in the circumferential direction between the clock mark 202 and the second wobble mark 204. Thus, even when a beam spot passes the vicinity of a boundary between the servo pattern areas, information in either one of the adjacent servo pattern areas can be obtained, thereby allowing detection to be performed accurately.

Particularly, in the optical recording medium 101 according to this embodiment, a shift amount (hereinafter, referred to as an eccentricity amount) between the track center and a rotation center can be detected accurately. This will be detailed in the following description.

When the eccentricity amount is small, the relative velocity in a radial direction between a beam spot irradiated onto an optical recording medium and the optical recording medium is low, and thus a movement amount in the radial direction between the beam spot and the optical recording medium 101 can be detected based on a tracking error signal.

On the other hand, when the eccentricity amount is large, a relative velocity in the radial direction between the beam spot and the optical recording medium is high, and this makes it difficult to detect a movement in the redial direction between the beam spot and the optical recording medium. This is because a frequency (track crossing frequency) at which a beam spot crosses a track center line becomes higher than sampling frequencies (frequencies at which the first and second wobble marks are reproduced) for generating a tracking error signal, so that the number of track crossings is hindered from being detected based on a tracking error signal.

However, in this embodiment, the number of tracks in each of the servo pattern areas is sufficiently smaller than $N/(2\times\pi)$. Accordingly, even when the track crossing frequency becomes higher than the sampling frequencies for generating a tracking error signal, the eccentricity amount can be detected accurately.

If the number of tracks in each of the servo pattern areas is set to be larger than $N/(2\times\pi)$, when the track crossing frequency becomes higher than the sampling frequencies for generating a tracking error signal, it may not be possible to detect changes of the servo pattern areas, so that the eccentricity amount can not be detected accurately.

Thus, according to the optical recording medium 101 of this embodiment, with respect to a relative movement in the radial direction between a beam spot irradiated onto the optical recording medium 101 and the optical recording medium 101, a moving direction and a movement amount can be measured accurately, thereby allowing the eccentricity amount to be detected accurately.

When the eccentricity amount is measured accurately, the correction of the eccentricity can be made easier. This allows a pull-in operation of tracking control or the like to be stabilized, thereby improving reliability of the whole equipment.

In this embodiment, the number of tracks in each of the servo pattern areas is set to be 20 as a value on the order of $N/(2\times\pi)/10$. When the eccentricity amount becomes large, the detection of the eccentricity amount based on a tracking error signal requires a more complicated process. Thus, in this embodiment, the number of tracks in each of the servo pattern areas is set to be reduced to a value on the order of $N/(2\times\pi)/10$, thereby allowing the eccentricity amount to be detected using a simplified circuit configuration.

Figure 3:
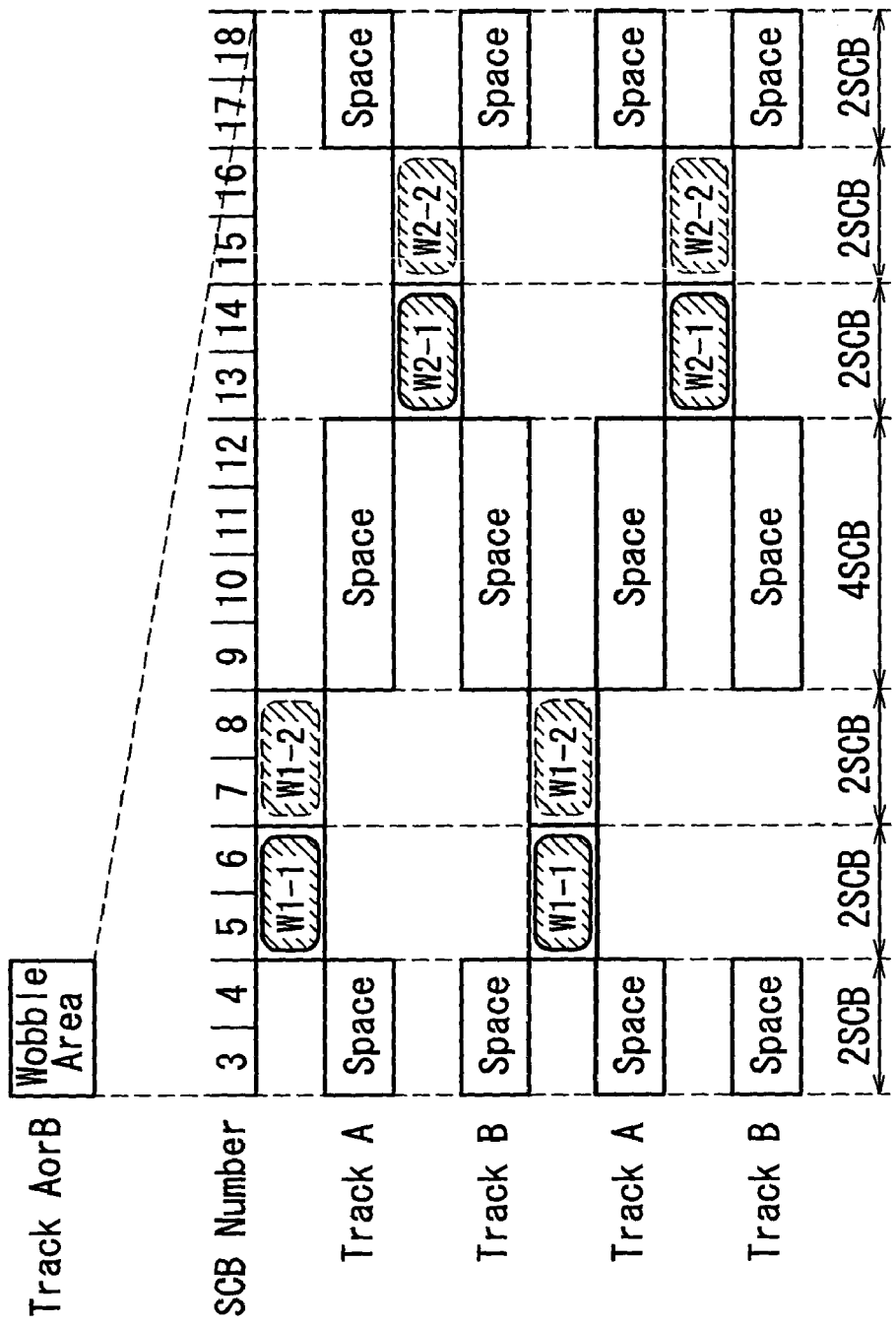
FIG. 3 is a diagram showing an example of a configuration of wobble marks and the vicinity thereof in the servo area 103 on the optical recording medium shown in FIG. 1.

FIG. 3 is a diagram showing an arrangement of wobble marks in the vicinity of the first and second wobble marks in the servo area 103 on the optical recording medium 101 according to this embodiment.

In FIG. 3, an upper side of the figure indicates an outer circumferential side of the optical recording medium 101, and a lateral direction indicates the circumferential direction of the optical recording medium 101. A SCB Number is numbered in order by setting a predetermined unit distance as one unit. Each of W1-1 and W1-2 indicates a position where the first wobble mark 203 is present, and each of W2-1 and W2-2 indicates a position where the second wobble mark 204 is present. A Track A is a track in which the first wobble mark 203 is present on the outer circumferential side, and a Track B is a track in which the first wobble mark 203 is present on an inner circumferential side. Further, a Space indicates an area without a mark.

FIG. 4 is a diagram showing an arrangement of the first and second wobble marks. On the inner circumferential side, a pattern (first servo pattern area 201a) in which the first wobble mark is in a position indicated by W1-1 and the second wobble mark is in a position indicated by W2-1 is arranged across 10 Tracks AB (the Track A and the Track B that are shown in FIG. 3 form one Track AB; therefore, 10 Tracks AB correspond to 20 tracks). On an outer circumferential side thereof, a pattern (second servo pattern area 201b) in which the first wobble mark is in a position indicated by W1-2, and the second wobble mark is in the position indicated by W2-1 is arranged across 10 Tracks AB. On an outer circumferential side thereof, a pattern (third servo pattern area 201c) in which the first wobble mark is in the position indicated by W1-2 and the second wobble mark is in a position indicated by W2-2 is arranged across 10 Tracks AB. On an outer circumferential side thereof, a pattern (fourth servo pattern area 201d) in which the first wobble mark is in the position indicated by W1-1 and the second wobble mark is in the position indicated by W2-2 is arranged across 10 Tracks AB.

Furthermore, on an outer circumferential side thereof, the pattern (first servo pattern area 201a) in which the first wobble mark is in the position indicated by W1-1 and the second wobble mark is in the position indicated by W2-1 is arranged across 10 Tracks AB. These patterns are arranged in this order repeatedly.

Embodiment 2

In Embodiment 2, the description is directed to an example of an eccentricity amount detecting device using the above-described optical recording medium according to Embodiment 1.

Figure 5:
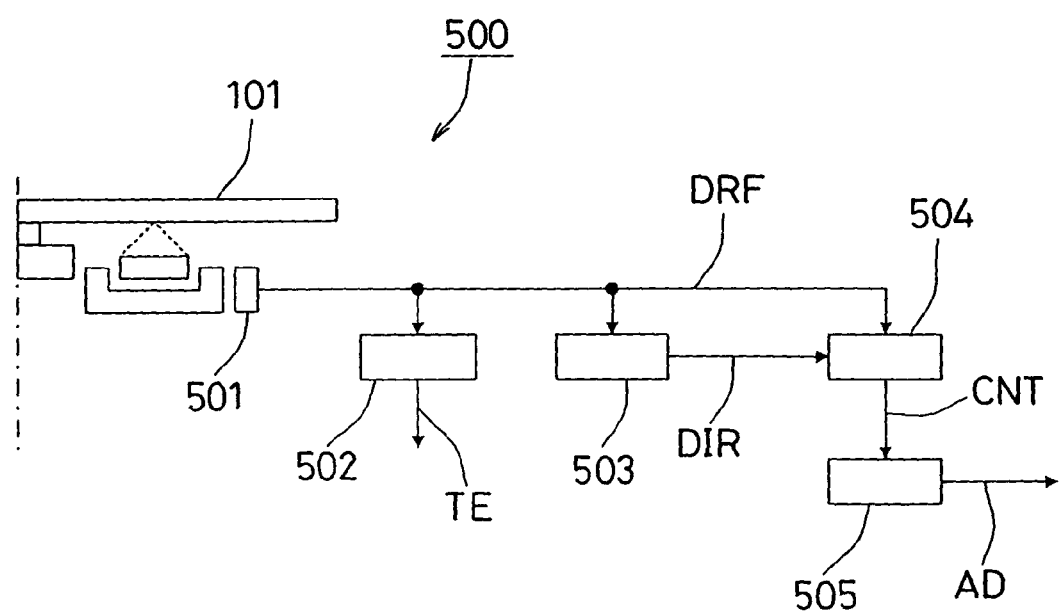
FIG. 5 is a schematic block diagram showing an example of a configuration of an eccentricity amount detecting device 500 according to Embodiment 2 of the present invention.

FIG. 5 is a schematic block diagram showing an example of a configuration of an eccentricity amount detecting device according to Embodiment 2 of the present invention.

In FIG. 5, an eccentricity amount detecting device 500 includes an optical recording medium 101, a detecting circuit 501, a tracking error generating circuit 502, a direction detecting part 503, a pattern counting part 504, and an eccentricity amount computing part 505. The optical recording medium 101 shown in FIG. 5 has the same configuration as that of the optical recording medium 101 described with regard to Embodiment 1.

When there is eccentricity between a disk center of the optical recording medium 101 and a center of the data area, a beam spot irradiated along the track center line 102 so as to read out data signals recorded in the data areas 104 and the optical recording medium 101 are to move relative to each other in the radial direction as the optical recording medium 101 is rotated. Further, also by an impact or the like, the beam spot and the optical recording medium 101 move relative to each other in the radial direction.

The eccentricity amount detecting device 500 according to this embodiment is used to detect a displacement amount with respect to such a relative movement in the radial direction between the optical recording medium 101 and the beam spot.

In order to read out recorded information, the detecting circuit 501 includes a semiconductor laser or the like that generates a beam spot to be irradiated onto the optical recording medium 101, and a reflected light detecting means that detects reflected light from the optical recording medium 101 and outputs a reproduction signal DRF according to the reflected light that has been detected. That is, the detecting circuit 501 functions as the sensor. The reproduction signal DRF thus output is input to each of the tracking error generating circuit 502, the direction detecting part 503 and the pattern counting part 504.

In the tracking error generating circuit 502, the reproduction signal DRF obtained by the second wobble mark 204 is subtracted from the reproduction signal DRF obtained by the first wobble mark 203, and thus a tracking error signal TE is generated. When a beam spot is on the track center line 102, the reproduction signal DRF obtained by the first wobble mark 203 and the reproduction signal DRF obtained by the second wobble mark 204 are equal in signal level, and thus a value of zero is output as the tracking error signal TE. When the beam spot is in a position shifted from the track center line 102, the reproduction signal DRF obtained by the first wobble mark 203 and the reproduction signal DRF obtained by the second wobble mark 204 are different from each other in signal level, and thus the tracking error signal TE has a value corresponding to a shift amount from the track center line 102. The tracking error signal TE is thus generated in the tracking error generating circuit 502. That is, the tracking error generating circuit 502 functions as the tracking error generating means. The tracking error signal TE thus output is used for tracking control or the like.

Figure 6:
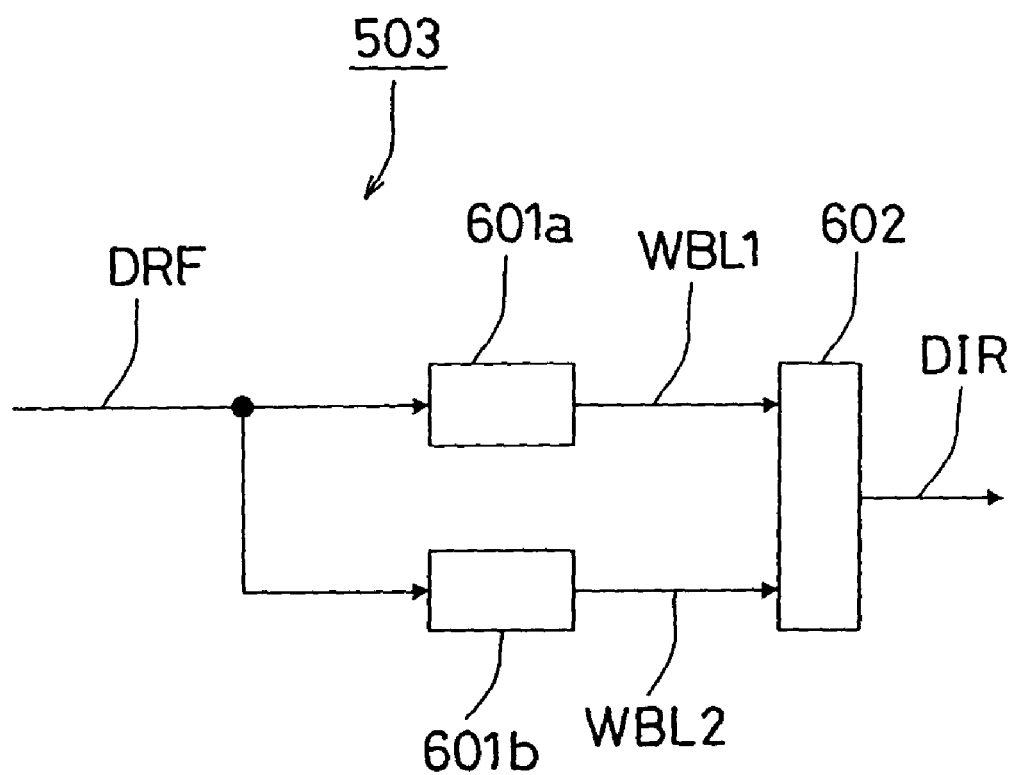
FIG. 6 is a block diagram showing an example of a direction detecting part 503 shown in FIG. 5.

In the direction detecting part 503, based on the reproduction signal DRF from the detecting circuit 501, a moving direction in the radial direction between the optical recording medium 101 and the beam spot on the optical recording medium 101 is detected, and thus a direction detection signal DIR is output. FIG. 6 specifically shows a configuration of the direction detecting part 503. In the following description, the direction detecting part 503 will be described with reference to FIG. 6.

As shown in FIG. 6, the reproduction signal DRF from the detecting circuit 501 is input to each of a first wobble mark position detecting part 601a and a second wobble mark position detecting part 601b. In the first wobble mark position detecting part 601a, it is judged whether the distance in the circumferential direction between the clock mark 202 and the first wobble mark 203 is either of L1a and L1b or either of L1c and L1d as shown in FIG. 2. When the distance in the circumferential direction between the clock mark 202 and the first wobble mark 203 is either of L1c and L1d, a first wobble mark position detection signal WBL1 that is to be of an "H" level ("H" indicates the high potential level) is output. On the other hand, when the distance in the circumferential direction between the clock mark 202 and the first wobble mark 203 is either of L1a and L1b, a first wobble mark position detection signal WBL1 that is to be of an "L" level ("L" indicates the low potential level) is output.

The distance in the circumferential direction between the clock mark 202 and the first wobble mark 203 can be detected easily based on the relationship of a temporal distance between the clock mark 202 and the first wobble mark 203.

Similarly, in the second wobble mark position detecting part 601b, it is judged whether the distance in the circumferential direction between the clock mark 202 and the second wobble mark 204 is either of L2a and L2d or either of L2b and L2c. When the distance in the circumferential direction between the clock mark 202 and the second wobble mark 204 is either of L2b and L2c, a second wobble mark position detection signal WBL2 that is to be of the "H" level ("H" indicates the high potential level) is output. On the other hand, when the distance in the circumferential direction between the clock mark 202 and the second wobble mark 204 is either of L2a and L2d, a second wobble mark position detection signal WBL2 that is to be of the "L" level ("L" indicates the low potential level) is output.

The distance in the circumferential direction between the clock mark 202 and the second wobble mark 204 can be detected easily based on the relationship of a temporal distance between the clock mark 202 and the second wobble mark 204.

In a direction judging part 602 shown in FIG. 6, the first wobble mark position detection signal WBL1 and the second wobble mark position detection signal WBL2 are input, and thus a direction detection signal DIR is output.

In the following description, an operation of the direction judging part 602 in the direction detecting part 503 will be described with reference to FIGS. 7 and 8.

Figure 7:
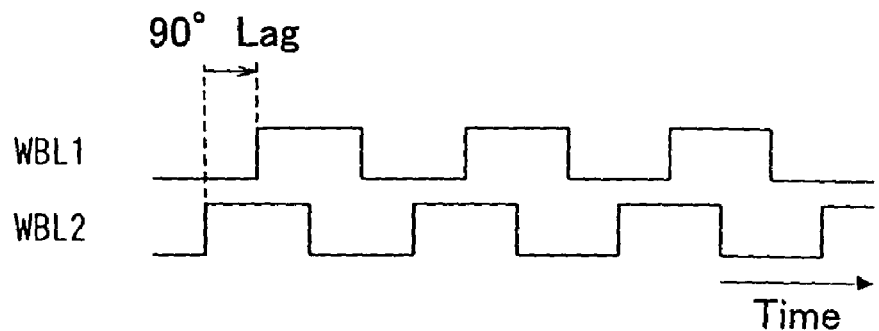
FIG. 7 is a diagram showing changes over time of first and second wobble mark position detection signals WBL1 and WBL2 when a beam spot moves in an outer circumferential direction on an optical recording medium 101.

FIG. 7 shows changes over time of the first wobble mark position detection signal WBL1 and the second wobble mark position detection signal WBL2 when a beam spot moves in an outer circumferential direction on the optical recording medium 101. As can be seen from FIG. 7, when the beam spot moves in the outer circumferential direction on the optical recording medium 101, the first wobble mark position detection signal WBL1 has a waveform having a phase lag of 90 degrees with respect to the second wobble mark position detection signal WBL2.

Figure 8:
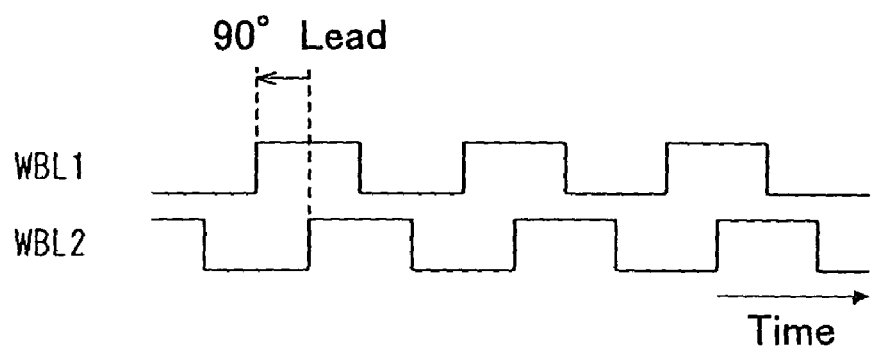
FIG. 8 is a diagram showing changes over time of the first and second wobble mark position detection signals WBL1 and WBL2 when the beam spot moves in an inner circumferential direction on the optical recording medium 101.

Furthermore, FIG. 8 shows changes over time of the first wobble mark position detection signal WBL1 and the second wobble mark position detection signal WBL2 when a beam spot moves in an inner circumferential direction on the optical recording medium 101. As can be seen from FIG. 8, when the beam spot moves in the inner circumferential direction on the optical recording medium 101, the first wobble mark position detection signal WBL1 has a waveform having a phase lead of 90 degrees with respect to the second wobble mark position detection signal WBL2.

In the direction judging part 602, when the beam spot moves in the outer circumferential direction on the optical recording medium 101, that is, when the first wobble mark position detection signal WBL1 has a waveform having a phase lag of 90 degrees with respect to the second wobble mark position detection signal WBL2, a signal with the "L" level is output as the direction detection signal DIR.

Furthermore, when the beam spot moves in the inner circumferential direction on the optical recording medium 101, the direction judging part 602 outputs a signal with the "H" level as the direction detection signal DIR.

Thus, in the direction detecting part 503, the direction detection signal DIR is generated to be output. That is, the direction detecting part 503 functions as the direction detecting means.

The direction detection signal DIR that has been output is subsequently input to the pattern counting part 504.

Figure 9:
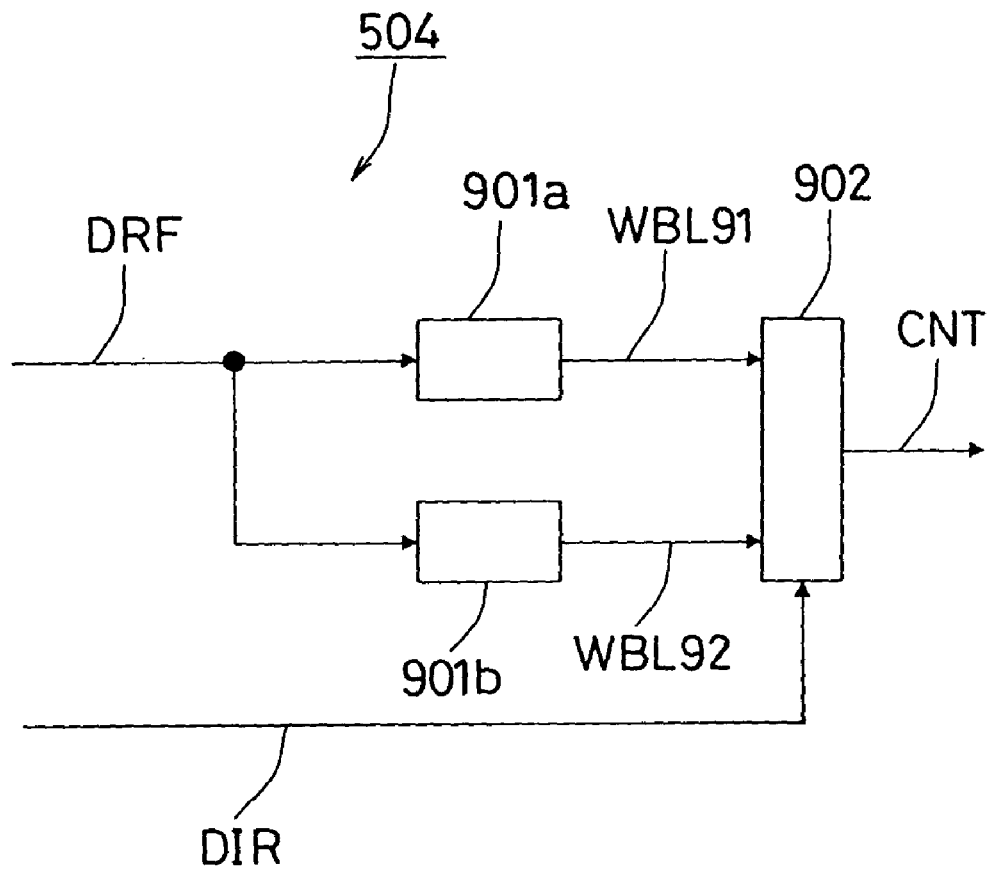
FIG. 9 is a block diagram showing an example of a pattern counting part 504 shown in FIG. 5.

In the pattern counting part 504 shown in FIG. 5, the reproduction signal DRF from the detecting circuit 501 and the direction detection signal DIR from the direction detecting part 503 are input, and with respect to the numbers of changes of the servo pattern areas, addition/subtraction is performed according to the direction detection signal DIR so that a result of the addition/subtraction is output as an output signal CNT. FIG. 9 specifically shows a configuration of the pattern counting part 504 shown in FIG. 5. In the following description, the pattern counting part 504 will be described with reference to FIG. 9.

The respective configurations and operations of a first wobble mark position detecting part 901a and a second wobble mark position detecting part 901b that are shown in FIG. 9 are the same as those of the first wobble mark position detecting part 601a and the second wobble mark position detecting part 601b in the direction detecting part 503 shown in FIG. 6, for which duplicate descriptions are omitted.

In a counting part 902 shown in FIG. 9, a first wobble mark position detection signal WBL91 output from the first wobble mark position detecting part 901a, a second wobble mark position detection signal WBL92 output from the second wobble mark position detecting part 901b, and the direction detection signal DIR output from the direction detecting part 503 are input, and thus a count signal CNT is output. Specifically, with respect to the number of changes of the first wobble mark position detection signal WBL91 and the number of changes of the second wobble mark position detection signal WBL92, addition and subtraction are performed according to a state of the direction detection signal DIR, and thus a result thus obtained is output as the count signal CNT. More specifically, when the direction detection signal DIR is of the "H" level (when a beam spot on the optical recording medium 101 is moving to an outer circumference), an adding operation is performed; when the direction detection signal DIR is of the "L" level (when the beam spot on the optical recording medium 101 is moving to an inner circumference), a subtracting operation is performed.

That is, the pattern counting part 504 functions as the pattern counting means. The count signal CNT that has been output is input to the eccentricity amount computing part 505 shown in FIG. 5.

In the eccentricity amount computing part 505, the count signal CNT from the pattern counting part 504 is input, and thus an eccentricity amount AD is output. Specifically, first of all, a maximum value and a minimum value of the output signal CNT are computed. Next, the minimum value is subtracted from the maximum value, and a resultant value is multiplied by n1 (the number of tracks included in each of the first, second, third and fourth servo pattern areas). The value thus obtained is output as the eccentricity amount AD.

That is, the eccentricity amount computing part 505 functions as the eccentricity amount computing means.

The eccentricity amount detecting device is configured in the aforementioned manner.

In the following description, an operation of the eccentricity amount detecting device according to this embodiment will be described specifically with reference to FIGS. 10, 11, 12 and 13. In each of FIGS. 10, 11, 12 and 13, a horizontal axis indicates time.

In the presence of eccentricity, a relative displacement amount in a radial direction is produced between a beam spot on the optical recording medium 101 and the optical recording medium 101. Each of FIGS. 10, 11 and 12 shows a displacement amount RD and a tracking error signal TE in such a case.

FIG. 10 shows waveforms of a displacement amount RD and a tracking error signal TE when the displacement amount RD is small. In this case, it can be seen that an amount of track crossing can be measured based on the tracking error signal TE.

FIG. 11 shows waveforms of a displacement amount RD and a tracking error signal TE when the displacement amount RD is somewhat large. Also in this case, an amount of track crossing can be measured based on the tracking error signal.

FIG. 12 shows waveforms of a displacement amount RD and a tracking error signal TE when the displacement amount RD is large. In this case, it can be seen that an amount of track crossing cannot be measured based on the tracking error signal because of large fluctuations of the tracking error signal TE.

According to the eccentricity amount detecting device of this embodiment, even in the state shown in FIG. 12, an eccentricity amount can be measured. This will be described with reference to FIG. 13.

The number of tracks in each of the servo pattern areas on the optical recording medium 101 according to Embodiment 1 is set to be a value sufficiently smaller than $N/(2 \times \pi)$ (N indicates the number of the servo areas per revolution on the optical recording medium 101, and $\pi$ indicates a ratio of circumference to diameter). Thus, as shown in FIG. 13, when there are fluctuations in waveform of the tracking error signal TE (when fluctuations occur in the tracking error signal TE, namely when the eccentricity amount is large), a beam spot on the optical recording medium 101 necessarily passes a plurality of servo patterns.

When a relative displacement is produced between the beam spot on the optical recording medium 101 and the optical recording medium 101 because of eccentricity, the beam spot moves from one servo pattern area to another. Because of this, in the first wobble mark position detecting part 601a and the second wobble mark position detecting part 601b of the direction detecting part 503, the first wobble mark position detection signal WBL1 according to the distance in the circumferential direction between the clock mark 202 and the first wobble mark 203 in the servo area 103 and the second wobble mark position detection signal WBL2 according to the distance in the circumferential direction between the clock mark 202 and the second wobble mark 204 in the servo area 103 are output. Thus, the direction signal DIR is output from the direction detecting part 503.

In the pattern counting part 504, addition/subtraction is performed with respect to changes of the first wobble mark position detection signal WBL1 and the second wobble mark position detection signal WBL2 according to the direction detection signal DIR, and thus the count signal CNT is output. In FIG. 13, the count signal CNT is shown in a manner for showing an analog signal.

Figure 13:
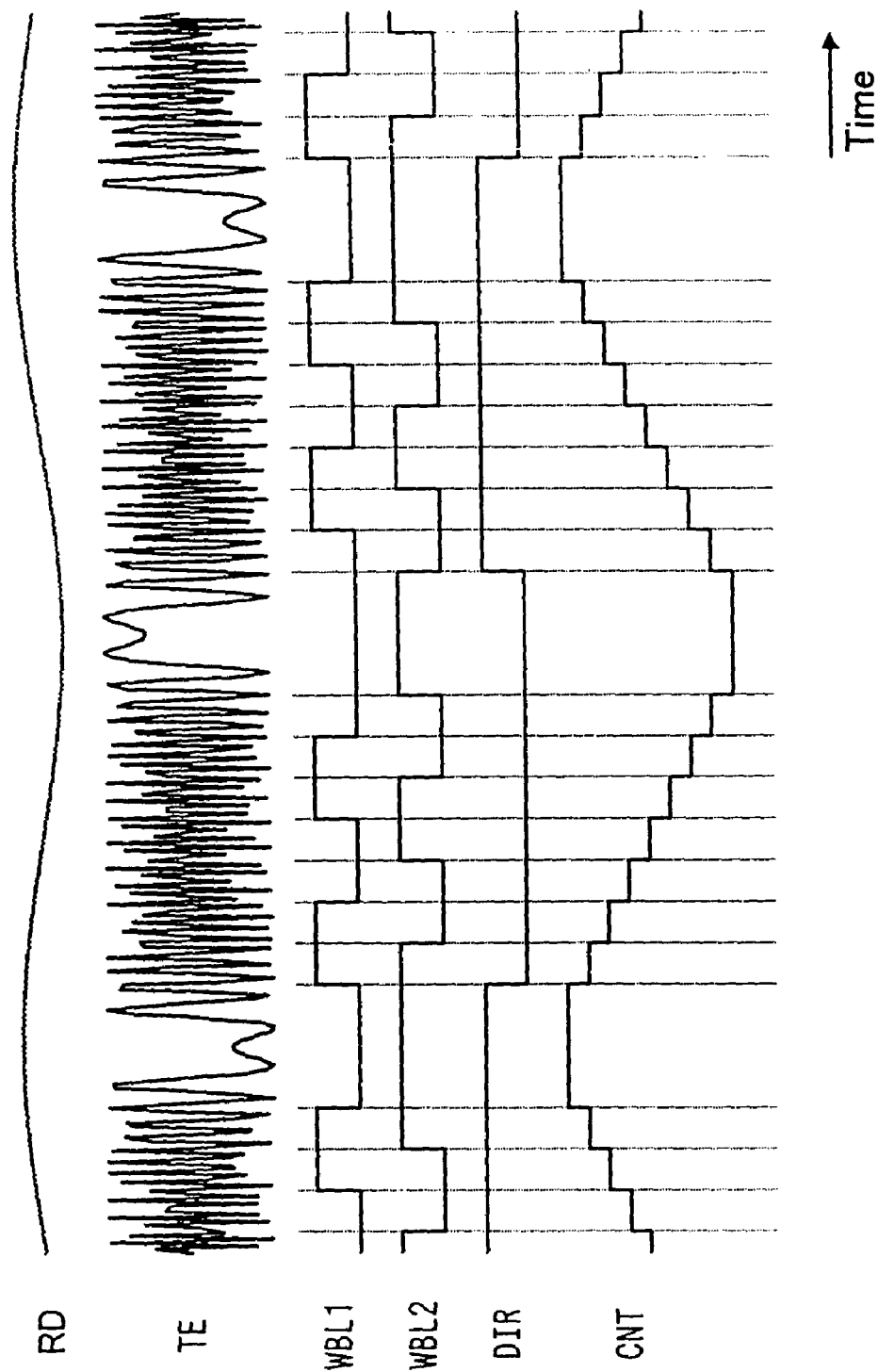
FIG. 13 is a waveform chart showing the respective waveforms of signals for explaining an operation of the eccentricity amount detecting device 500 according to Embodiment 2 of the present invention.

As shown in FIG. 13, the count signal CNT has an amount corresponding to an eccentricity amount (displacement amount).

In the eccentricity amount computing part 505, a value obtained as a difference between a maximum value and a minimum value of the count signal CNT from the pattern counting part 504 is multiplied by n1, and a resultant value is output as an eccentricity amount. This computing is based on the following principle. That is, since the number of tracks included in one servo pattern area is n1, when the count signal CNT from the pattern counting part 504 that represents the number of changes of the servo pattern areas is multiplied by n1, the value thus obtained defines an eccentricity amount.

The eccentricity amount is represented by a value as the number of tracks.

When an eccentricity amount representing a relative displacement amount between a beam spot on the optical recording medium 101 and the optical recording medium 101 is determined, the eccentricity can be corrected easily by supplying an objective lens or the like with electric power according to the eccentricity amount, thereby allowing a pull-in operation of tracking control to be stabilized remarkably.

Embodiment 3

In Embodiment 3, the description is directed to another example of the optical recording medium according to the present invention.

Figure 14:
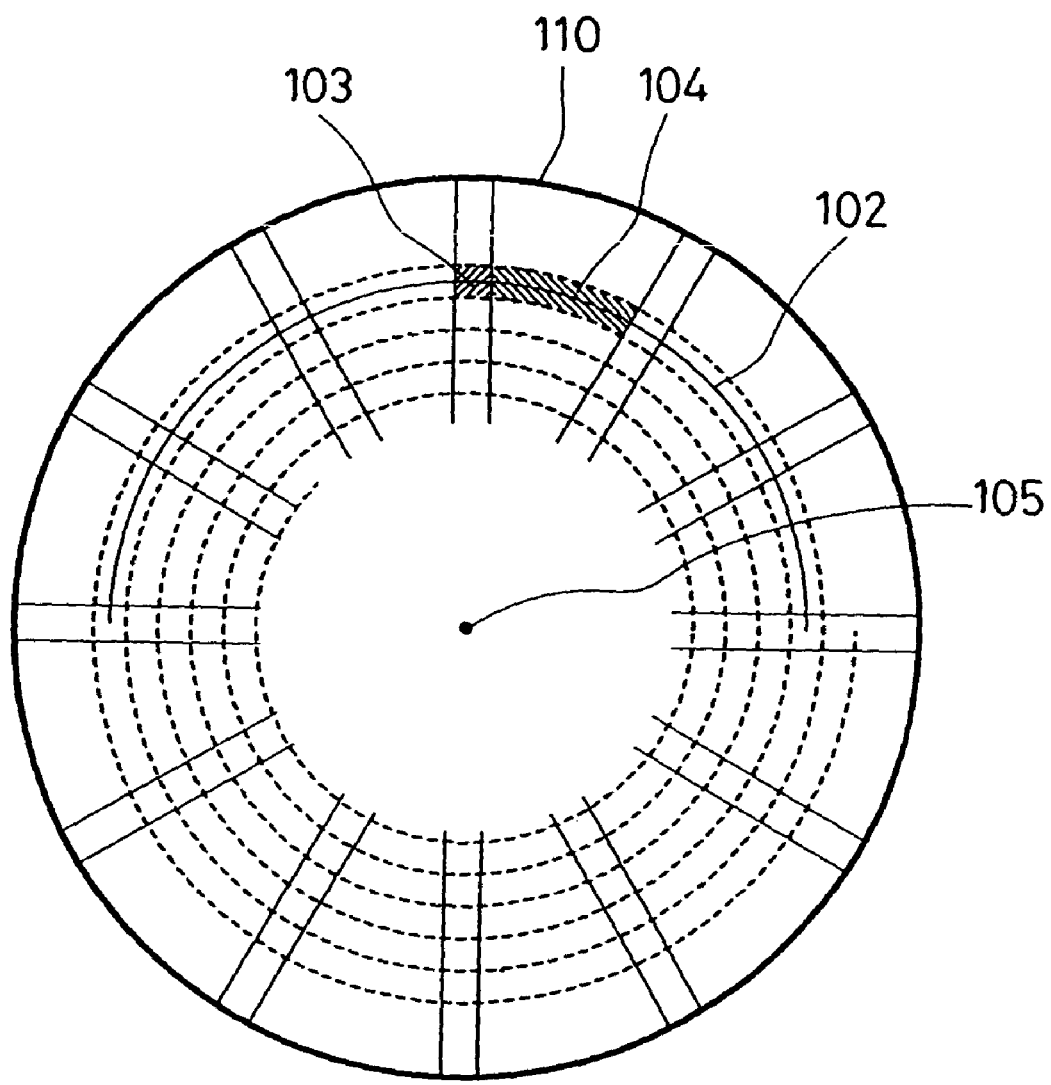
FIG. 14 is a schematic plan view showing an example of a configuration of an optical recording medium according to Embodiment 3 of the present invention.

FIG. 14 is a schematic plan view showing a configuration of an optical recording medium 110 according to Embodiment 3 of the present invention.

In FIG. 14, the optical recording medium 110 is in the shape of a disk on which a virtual track center line 102 (only a part thereof is shown in FIG. 14) is provided spirally. In the optical recording medium 110, a servo area 103 and a data area 104 are arranged alternately in a disk circumferential direction. The data area 104 is used for information recording and reproduction. The number of each of the servo areas 103 and the data areas 104 that are arranged is N (N is an integer of not less than 500; herein, N is assumed to be 1,280).

A disk center 105 shown in FIG. 14 is a virtual point positioned at a center of the disk-shaped optical recording medium 110.

The track center line 102 is a virtual line along which a beam spot should travel when data recorded on the optical recording medium 110 is read out.

FIG. 15 is a schematic plan view showing the servo area in a radial direction of the optical recording medium 110.

As shown in FIG. 15, the servo area 103 includes a first wobble mark 211 and a second wobble mark 212. The first wobble mark 211 and the second wobble mark 212 are used to detect a tracking error and arranged respectively in positions shifted in opposite directions by interposing the track center line 102 between them. In the optical recording medium 110 according to Embodiment 3, a distance in the circumferential direction between the first wobble mark 211 and the second wobble mark 212 varies according to a distance in the radial direction from the disk center 105.

The servo area 103 is composed of a plurality of servo pattern areas having different patterns of wobble mark arrangement. The plurality of servo pattern areas are arranged in order repeatedly in the radial direction.

As shown in FIG. 15, the servo area 103 is composed of three types of servo pattern areas, namely a first servo pattern area 210a, a second servo pattern area 210b and a third servo pattern area 210c. The first servo pattern area 210a, the second servo pattern area 210b and the third servo pattern area 210c are arranged in order repeatedly in the radial direction.

The first servo pattern area 210a is formed in the radial direction across n1 tracks (n1 is sufficiently small compared with N/(2×π) and an integer not less than 5; herein, n1 is assumed to be 20; and only a part of the n1 tracks is shown in FIG. 15). The second servo pattern area 210b is formed in the radial direction across n2 tracks (n2 is sufficiently small compared with N/(2×π) and an integer not less than 5; herein, n2 is assumed to be 20; and only a part of the n2 tracks is shown in FIG. 15). The third servo pattern area 210c is formed in the radial direction across n3 tracks (n3 is sufficiently small compared with N/(2×π) and an integer not less than 5; herein, n3 is assumed to be 20; and only a part of the n3 tracks is shown in FIG. 15).

Herein, n1, n2 and n3 are assumed to have the same value.

The first servo pattern area 210a includes a first wobble mark 211a and a second wobble mark 212. The second servo pattern area 210b includes a first wobble mark 211b and the second wobble mark 212. The third servo pattern area 210c includes a first wobble mark 211c and the second wobble mark 212.

The first, second and third servo pattern areas 210a, 210b and 210c are different from each other in the distance in the circumferential direction between the first wobble mark 211 and the second wobble mark 212. That is, the first servo pattern area 210a has a distance Da in the circumferential direction between the first wobble mark 211a and the second wobble mark 212. Further, the second servo pattern area 210b has a distance Db in the circumferential direction between the first wobble mark 211b and the second wobble mark 212. Further, the third servo pattern area 210c has a distance Dc in the circumferential direction between the first wobble mark 211c and the second wobble mark 212.

In the above-described optical recording medium 110, a relative movement amount and a moving direction in the radial direction between a beam spot irradiated onto the optical recording medium and the optical recording medium can be detected.

Particularly, in the optical recording medium 110 according to this embodiment, an eccentricity amount can be detected accurately as in the optical recording medium 101 according to Embodiment 1.

Figure 16:
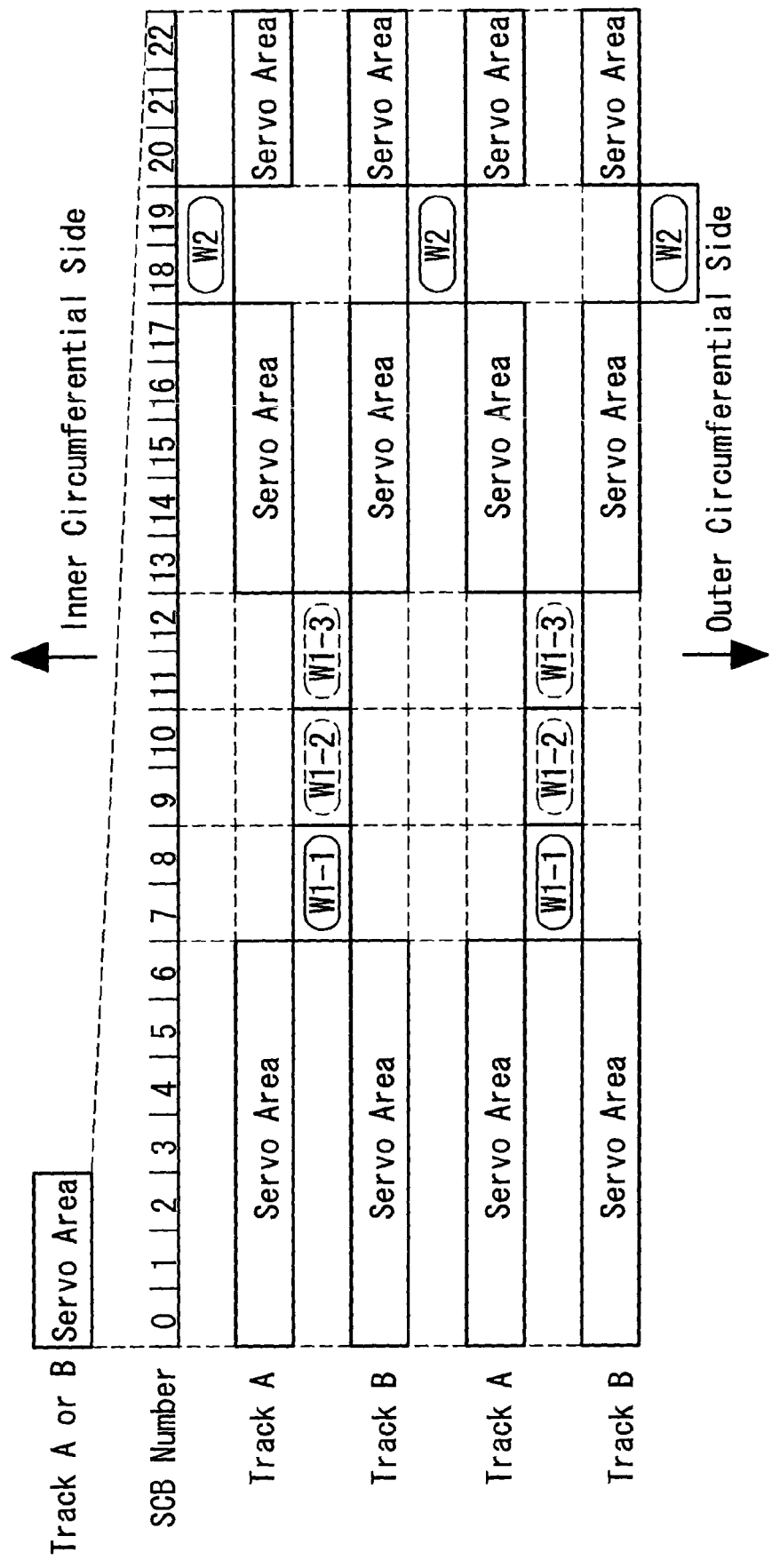
FIG. 16 is a diagram showing an example of a configuration of wobble marks and the vicinity thereof in the servo area 103 on the optical recording medium shown in FIG. 14.

FIG. 16 is a diagram showing an arrangement of wobble marks in the vicinity of the first and second wobble marks in the servo area 103 on the optical recording medium 110 according to this embodiment.

In FIG. 16, an upper side of the figure indicates an inner circumferential side of the optical recording medium 110, and a lateral direction indicates the circumferential direction of the optical recording medium. A SCB Number is numbered in order by setting a predetermined unit distance as one unit. Each of W1-1, W1-2 and W-3 indicates a position where the first wobble mark 211 is present, and W2 indicates a position where the second wobble mark 212 is present. A Track A is a track in which the first wobble mark 211 is present on an outer circumferential side, and a Track B is a track in which the first wobble mark 211 is present on an inner circumferential side. Further, a Space indicates an area without a mark.

Figure 17:
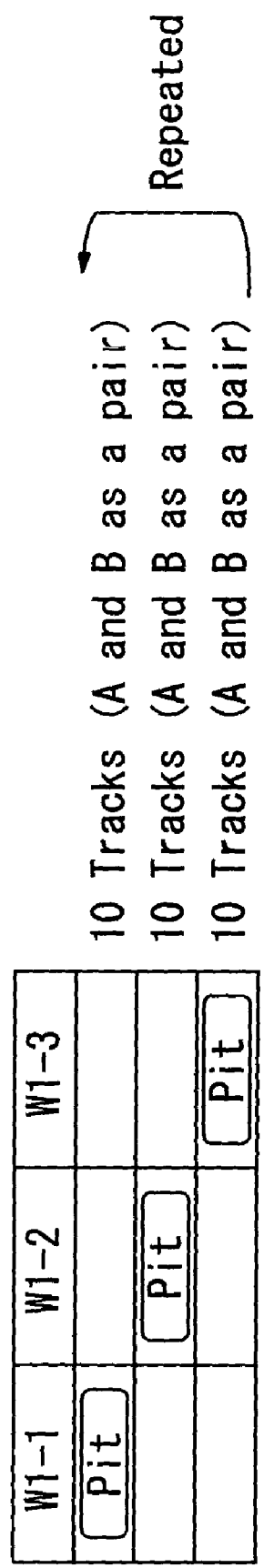
FIG. 17 is a diagram showing an example of how the wobble marks are arranged in the servo area 103 on the optical recording medium shown in FIG. 14.

FIG. 17 is a diagram showing an arrangement of the first wobble marks 211. On the inner circumferential side, a pattern (first servo pattern area 210a) in which the first wobble mark 211 is in a position indicated by W1-1 is arranged across 10 Tracks AB (the Track A and the Track B that are shown in FIG. 16 form one Track AB; therefore, 10 Tracks AB correspond to 20 tracks). On an outer circumferential side thereof, a pattern (second servo pattern area 210b) in which the first wobble mark 211 is in a position indicated by W1-2 is arranged across 10 Tracks AB. On an outer circumferential side thereof, a pattern (third servo pattern area 210c) in which the first wobble mark 211 is in a position indicated by W1-3 is arranged across 10 Tracks AB.

Furthermore, on an outer circumferential side thereof, the pattern (first servo pattern area 210a) in which the first wobble mark 211 is in the position indicated by W1-1 is arranged across 10 Tracks AB. These patterns are arranged in this order repeatedly.

Particularly, in the optical recording medium 110 according to this embodiment, the second wobble mark also functions as a clock mark, and thus compared with the optical recording medium 101 according to Embodiment 1, each of the servo areas in the circumferential direction can be reduced in size, so that an area of each of the data areas can be increased, thereby allowing a data recording capacity to be increased.

Embodiment 4

In Embodiment 4, the description is directed to an example of an eccentricity amount detecting device using the above-mentioned optical recording medium 110 according to Embodiment 3.

Figure 18:
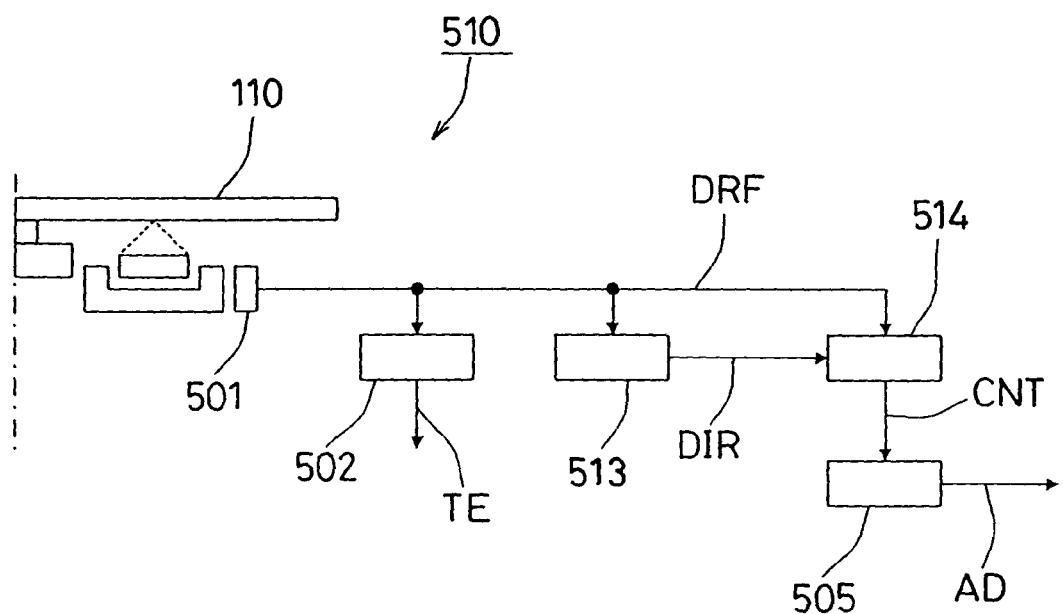
FIG. 18 is a schematic block diagram showing an example of a configuration of an eccentricity amount detecting device 510 according to Embodiment 4 of the present invention.

FIG. 18 is a schematic block diagram showing an example of a configuration of the eccentricity amount detecting device according to Embodiment 4 of the present invention.

In FIG. 18, an eccentricity amount detecting device 510 includes an optical recording medium 110, a detecting circuit 501, a tracking error generating circuit 502, a direction detecting part 513, a pattern counting part 514, and an eccentricity amount computing part 505. The optical recording medium 110 shown in FIG. 18 has the same configuration as that of the optical recording medium 110 described with regard to Embodiment 3.

When there is eccentricity between a disk center of the optical recording medium 110 and a center of the data area, a beam spot irradiated along the track center line 102 so as to read out data signals recorded in the data areas 104 and the optical recording medium 110 move relative to each other in the radial direction as the optical recording medium 110 is rotated. Further, also due to an impact or the like, the beam spot and the optical recording medium 110 can move relative to each other in the radial direction.

The eccentricity amount detecting device 510 according to this embodiment is used to detect a displacement amount with respect to such a relative movement in the radial direction between the optical recording medium 110 and the beam spot.

The detecting circuit 501, the tracking error generating circuit 502, and the eccentricity amount computing part 505 have the same configurations as those in the eccentricity amount detecting device 500 shown in FIG. 5, for which duplicate descriptions are omitted.

The direction detecting part 513 detects a moving direction in the radial direction between the optical recording medium 110 and a beam spot on the optical recording medium 110 based on a reproduction signal DRF from the detecting circuit 501, and outputs a direction detection signal DIR to the pattern counting part 514. The direction detecting part 513 corresponds to the direction detecting means.

Figure 19:
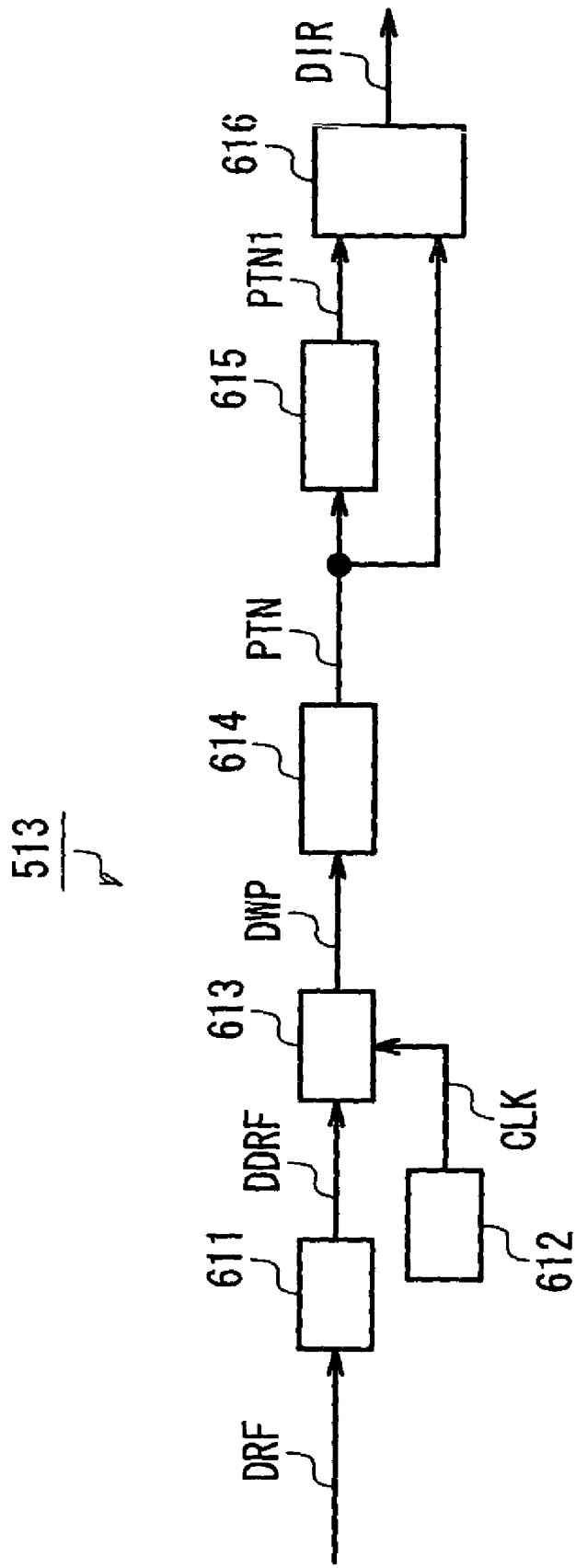
FIG. 19 is a block diagram showing an example of a direction detecting part 513 shown in FIG. 18.

FIG. 19 is a block diagram specifically showing a configuration of the direction detecting part 513. In FIG. 19, the reproduction signal DRF from the detecting circuit 501 is binarized in a binarizing circuit 611 to be converted to a reproduction digital signal DDRF.

The reproduction digital signal DDRF is input to a time interval measuring circuit 613. Further, a clock CLK having a predetermined frequency from an oscillating circuit 612 also is input to the time interval measuring circuit 613. The time interval measuring circuit 613 measures a time interval between the first wobble mark 211 and the second wobble mark in the reproduction digital signal DDRF by counting the number of pulses of the clock CLK, and outputs a result thus obtained as a wobble interval DWP. The wobble interval DWP from the time interval measuring circuit 613 is input to a pattern judging circuit 614.

The pattern judging circuit 614 judges a type (namely, the first servo pattern area 210a, the second servo pattern area 210b or the third servo pattern area 210c that are shown in FIG. 15) of the servo pattern area based on the wobble interval DWP, and outputs the result of the judgment as a pattern judgment signal PTN to each of a hold circuit 615 and a direction determining circuit 616.

When the wobble interval DWP has a value higher than a first predetermined value, the pattern judging circuit 614 judges that the type is of the first servo pattern area 211a (wobble interval DWP=Da). Further, when the wobble interval DWP has a value lower than the first predetermined value and higher than a second predetermined value, the pattern judging circuit 614 judges that the type is of the second servo pattern area 211b (wobble interval DWP=Db). Furthermore, when the wobble interval DWP has a value lower than a third predetermined value, the pattern judging circuit 614 judges that the type is of the third servo pattern area 211c (wobble interval DWP=Dc).

The pattern judging circuit 614 corresponds to the pattern judging means.

The hold circuit 615 holds a content of the pattern judgment signal PTN each time the content of the pattern judgment signal PTN from the pattern judging circuit changes, and outputs the content at one timing before that has been held as a lag pattern judgment signal PTN1 to a direction determining circuit 616.

The direction determining circuit 616 outputs a direction detection signal DIR corresponding to a moving direction in the radial direction between the optical recording medium 110 and a beam spot on the optical recording medium 110 based on the pattern judgment signal PTN from the pattern judging circuit 614 and the lag pattern judgment signal PTN1 from the hold circuit 615.

The direction determining circuit 616 corresponds to the direction determining means.

In the following description, an operation of the direction detecting part 513 having the above-described configuration will be described in detail.

Figure 20:
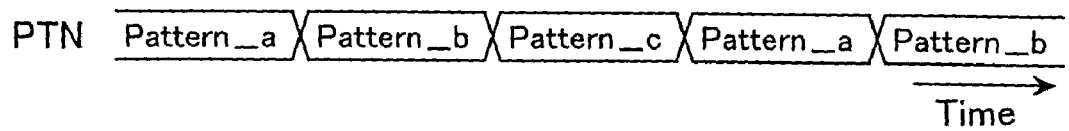
FIG. 20 is a timing chart showing changes over time of a content of a pattern judgment signal PTN when a beam spot moves in an outer circumferential direction on an optical recording medium 110.

FIG. 20 is a timing chart showing changes over time of the content of the pattern judgment signal PTN when a beam spot moves in an outer circumferential direction on the optical recording medium 110. In FIG. 20, when the pattern judgment signal PTN has a content indicated by Pattern_a, the type of the servo pattern area is of the first servo pattern area 210a. Further, when the pattern judgment signal PTN has a content indicated by Pattern_b, the type of the servo pattern area is of the second servo pattern area 210b. Furthermore, when the pattern judgment signal PTN has a content indicated by Pattern_c, the type of the servo pattern area is of the third servo pattern area 210c.

In FIG. 20, since the beam spot moves in the outer circumferential direction on the optical recording medium 110, the content of the pattern judgement signal PTN varies from Pattern_a to Pattern_b, further from Pattern_b to Pattern_c, and still further from Pattern_c to Pattern_a. The direction determining circuit 616 shown in FIG. 19 detects these changes, namely the change from Pattern_a to Pattern_b, the change from Pattern_b to Pattern_c, and the change from Pattern_c to Pattern_a, and outputs a signal with a logical level of "H" as the direction detection signal DIR.

Figure 21:
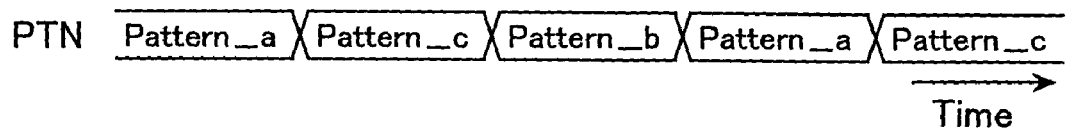
FIG. 21 is a timing chart showing changes over time of the content of the pattern judgment signal PTN when the beam spot moves in an inner circumferential direction on the optical recording medium 110.

Meanwhile, FIG. 21 is a timing chart showing the changes over time of the content of the pattern judgment signal PTN when the beam spot moves in an inner circumferential direction on the optical recording medium 110.

In FIG. 21, since the beam spot moves in the inner circumferential direction on the optical recording medium 110, the content of the pattern judgment signal PTN varies from Pattern_a to Pattern_c, further from Pattern_c to Pattern_b, and still further from Pattern_b to Pattern_a. The direction determining circuit 616 shown in FIG. 19 detects these changes, namely the change from Pattern_a to Pattern_c, the change from Pattern_c to Pattern_b, and the change from Pattern_b to Pattern_a, and outputs a signal with a logical level of "L" as the direction detection signal DIR.

As described above, the direction detecting part 513 detects a moving direction in the radial direction between the optical recording medium 110 and the beam spot on the optical recording medium 110 based on the reproduction signal DRF from the detecting circuit 501 and outputs the direction detection signal DIR according to the direction thus detected.

Referring back to FIG. 18, the reproduction signal DRF from the detecting circuit 501 and the direction detection signal DIR from the direction detecting part 513 are input to the pattern counting part 514. Then, addition/subtraction is performed with respect to the number of changes of the servo pattern areas according to the direction detection signal DIR, and a result thus obtained is output as a count value CNT.

Figure 22:
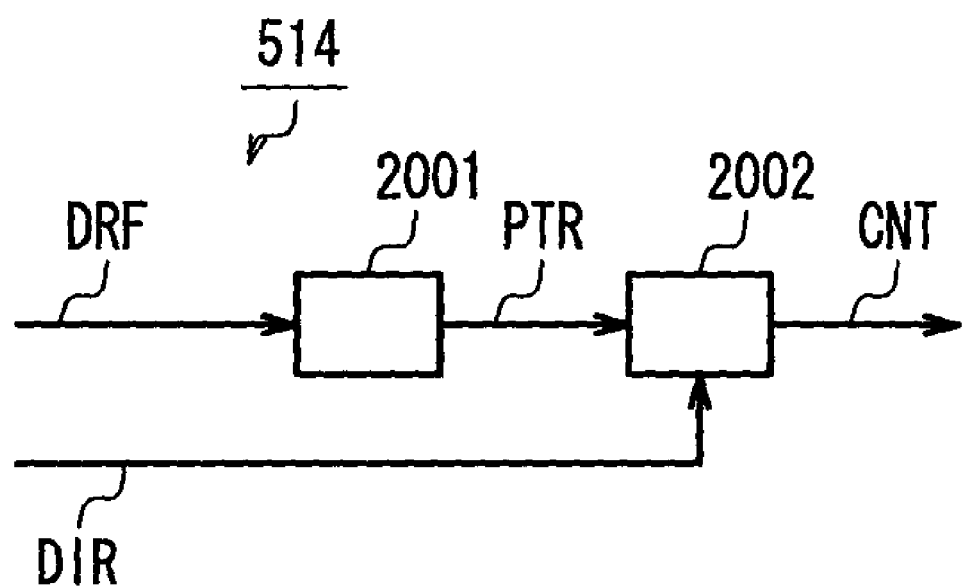
FIG. 22 is a block diagram showing an example of a pattern counting part 514 shown in FIG. 18.
Figure 23:
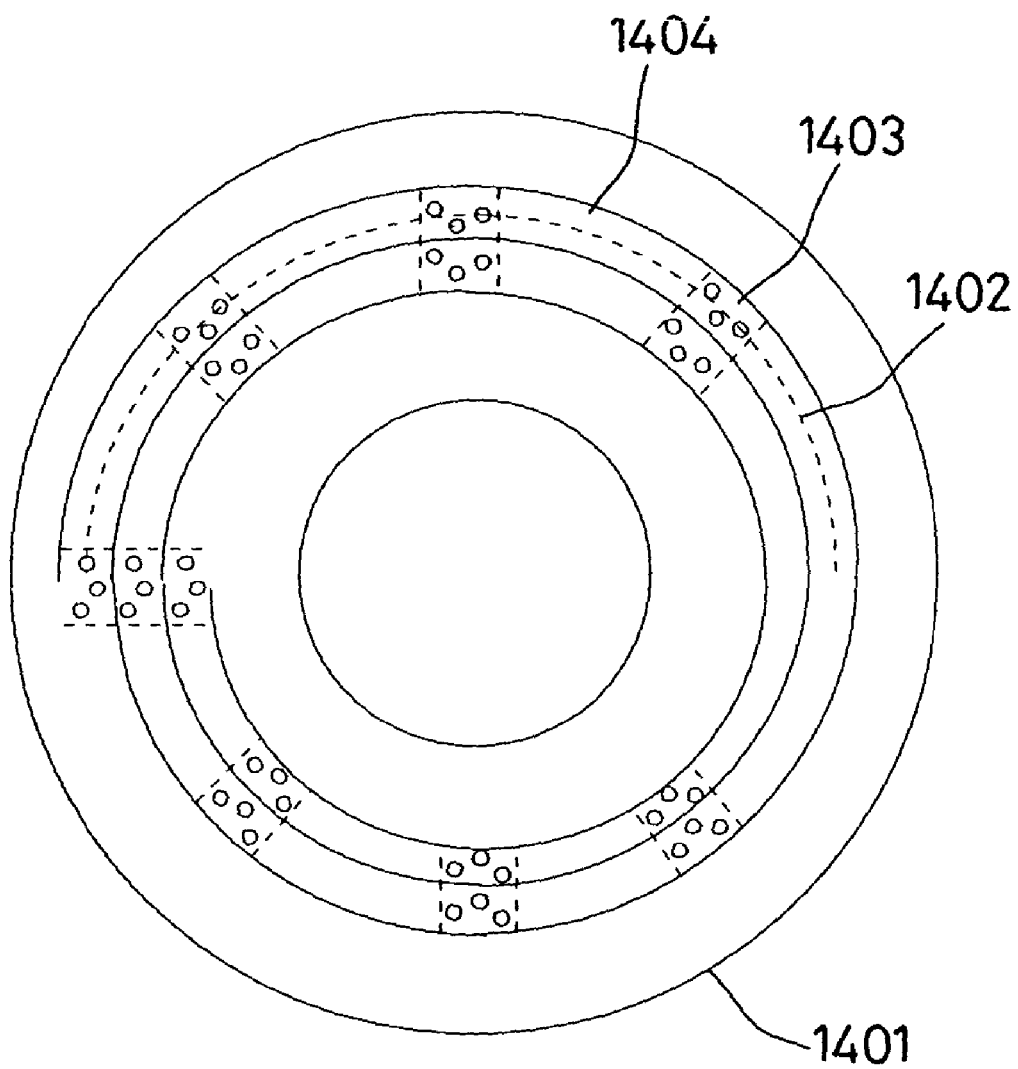
FIG. 23 is a schematic plan view showing an example of a conventional optical recording medium.
Figure 24:
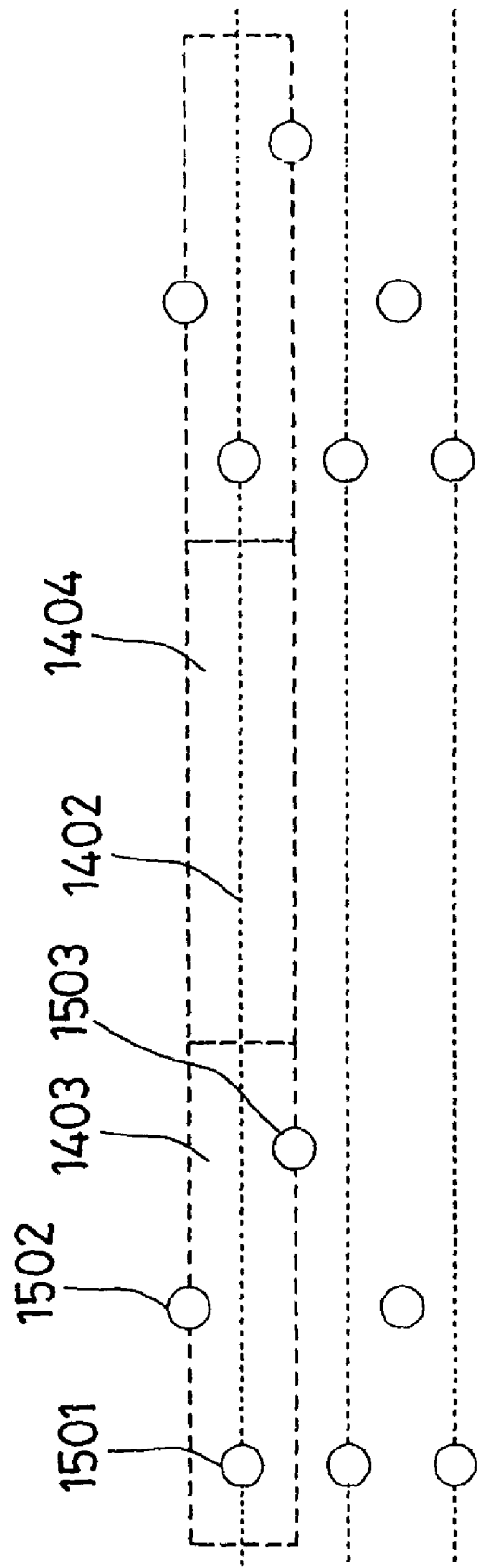
FIG. 24 is a schematic diagram showing an example of a servo area and a data area on the conventional optical recording medium.

FIG. 22 is a block diagram specifically showing a configuration of the pattern counting part 514. In FIG. 22, the reproduction signal DRF from the detecting circuit 501 is input to a servo pattern detecting part 2001, and the type of the servo pattern area is judged. The servo pattern detecting part 2001 is configured by using the respective circuits having the same configurations as those of the binarizing circuit 611, the oscillating circuit 612, the time interval measuring circuit 613 and the pattern judging circuit 614 in the direction detecting part 513.

The result of the judgment from the servo pattern detecting part 2001 is input to a counting part 2002 as a servo pattern judgment signal PTR. Further, the direction detection signal DIR from the direction detecting part 513 is input to the counting part 2002. The counting part 2002 counts the number of changes in the content of the servo pattern judgment signal PTR from the servo pattern detecting part 2001 according to the content of the direction detection signal DIR, and outputs a result thus obtained as a count value CNT.

Specifically, when the direction detection signal DIR has a content of a logical level of "H", the counting part 2002 counts the number of changes in the content of the servo pattern judgment signal PTR by addition. On the other hand, when the direction detection signal DIR has a content of a logical level "L", the counting part 2002 counts the number of changes in the content of the servo pattern judgment signal PTR by subtraction.

Referring again back to FIG. 18, the count value CNT from the pattern counting part 514 is input to the eccentricity amount computing part 505, and the eccentricity amount computing part 505 outputs an eccentricity amount AD. Specifically, first of all, a maximum value and a minimum value of the count value CNT are computed. Next, the minimum value is subtracted from the maximum value, and a resultant value is multiplied by n1 (the number of tracks included in each of the first, second and third servo pattern areas) so as to be output as the eccentricity amount AD.

That is, the eccentricity amount computing part 505 functions as the eccentricity amount computing means.

The eccentricity amount detecting device 510 is configured as described above. An eccentricity amount detecting operation of the eccentricity amount detecting device 510 according to this embodiment is the same as that of the eccentricity amount detecting device 500 according to Embodiment 2.

Particularly, in the eccentricity amount detecting device 510 according to this embodiment, the type of the servo pattern area is judged solely by measuring a time interval between the first wobble mark and the second wobble mark by the time interval measuring circuit 613, and thus an eccentricity amount can be detected by using an extremely simple configuration.

In each of the foregoing embodiments, the description was made by way of an example. However, the present invention is not limited thereto, and may be embodied in other forms based on the technical idea of the invention. For example, a method can be employed in which a reproduction signal is converted directly from an analogue signal to a digital signal, and the same processing as that described above with regard to Embodiment 2 is performed. Needless to say, in this case, the same effect also can be obtained.

Furthermore, the optical recording medium according to the present invention may include another area such as an address area between the servo area and the data area.

Furthermore, the data area may include a mark and may be formed of grooves or the like. Needless to say, as long as the servo area can be detected, the same effect can be obtained.

Moreover, in this embodiment, the clock mark, the first wobble mark and the second wobble mark on the optical recording medium were of a circular shape. However, these marks may be in other forms such as of an oval, a rectangle and the like, or may be of other mark systems. As long as the marks can be used to discriminate the servo pattern areas, they can provide the same effect as that of the present invention and are embraced in the scope of the present invention.

As described in the foregoing description, according to the optical recording medium of the present invention, in the servo areas, either of the distance in the circumferential direction between the clock mark and the first wobble mark, the distance in the circumferential direction between the clock mark and the second wobble mark, and the distance in the circumferential direction between the first wobble mark and the second wobble mark varies according to the distance in the radial direction from the disk center. Thus, a relative movement amount and a moving direction in the radial direction between a beam spot irradiated onto the optical recording medium and the optical recording medium can be detected, thereby allowing an eccentricity amount to be detected.

Furthermore, according to the optical recording medium of the present invention, even when a beam spot passes the vicinity of a boundary between the servo pattern areas, information in either one of the adjacent servo pattern areas can be obtained, thereby allowing a detecting operation to be performed accurately.

Furthermore, in the optical recording medium according to the present invention, the lengths of the respective servo areas are set to be uniform regardless of the radius. Thus, an area ratio of the servo areas in an outer circumferential portion can be lowered, and thus the area of each of the data areas can be increased correspondingly. As a result, the data recording capacity can be increased.

Moreover, according to the optical recording medium of the present invention, when the tracking error signal TE fluctuates, namely when the eccentricity amount is large, a beam spot on the optical recording medium 101 necessarily passes a plurality of servo pattern areas, and thus an eccentricity amount can be detected based on information regarding changes of the servo pattern areas.

In addition, according to the eccentricity amount detecting device of the present invention, an eccentricity amount representing a relative movement amount in the radial direction between a beam spot irradiated onto the optical recording medium and the optical recording medium can be detected accurately, thereby allowing a pull-in operation of tracking control or the like to be highly stabilized.

The invention claimed is:

1. An optical recording medium in which a plurality (N) of servo areas each including a clock mark, a first wobble mark and a second wobble mark, and a plurality (N) of data areas for performing information recording and reproduction are arranged alternately in a circumferential direction,
   wherein each of the servo areas is composed of a plurality of servo pattern areas arranged in a radial direction, which vary in a distance in the circumferential direction between the clock mark and the first wobble mark, and a distance in the circumferential direction between the clock mark and the second wobble mark;

the plurality of servo pattern areas include the same number of tracks, and the number is less than $N/(2\times\pi)$ ($\pi$ indicates a ratio of circumference to diameter); and the servo pattern areas adjacent to each other among the plurality of servo pattern areas are substantially equal in one of the distance in the circumferential direction between the clock mark and the first wobble mark and the distance in the circumferential direction between the clock mark and the second wobble mark.

2. An optical recording medium in which a plurality (N) of servo areas each including a clock mark, a first wobble mark and a second wobble mark, and a plurality (N) of data areas for performing information recording and reproduction are arranged alternately in a circumferential direction, wherein each of the servo areas is composed of a plurality of servo pattern areas arranged in a radial direction, which vary in a distance in the circumferential direction between the clock mark and the first wobble mark, and a distance in the circumferential direction between the clock mark and the second wobble mark; and the plurality of servo pattern areas include the same number of tracks, and the number is less than $N/(2\times\pi)$ ($\pi$ indicates a ratio of circumference to diameter), and wherein the plurality of servo pattern areas are composed of a first servo pattern area, a second servo pattern area, a third servo pattern area, and a fourth servo pattern area;

the first servo pattern area and the second servo pattern area are substantially equal in the distance in the circumferential direction between the clock mark and the first wobble mark;

the second servo pattern area and the third servo pattern area are substantially equal in the distance in the circumferential direction between the clock mark and the second wobble mark;

the third servo pattern area and the fourth servo pattern area are substantially equal in the distance in the circumferential direction between the clock mark and the first wobble mark; and the fourth servo pattern area and the first servo pattern area are substantially equal in the distance in the circumferential direction between the clock mark and the second wobble mark.

3. An eccentricity amount detecting device using an optical recording medium in which a plurality of servo pattern areas having different patterns are arranged in a radial direction, the plurality of servo pattern areas including the same number of tracks, and the number being less than $N/(2\times\pi)$ ($\pi$ indicates a ratio of circumference to diameter), the device comprising:

a sensor that detects reflected light from the optical recording medium;

a direction detecting means that detects a direction of a relative movement in the radial direction between a position on the optical recording medium and a beam spot focused by an objective lens based on a detection signal from the sensor and outputs a result thus obtained as a direction detection signal;

a pattern counting means that counts changes of the servo pattern areas based on the detection signal from the sensor and the direction detection signal from the direction detecting means; and an eccentricity amount computing means that determines an eccentricity amount based on a count value from the pattern counting means.

4. The eccentricity amount detecting device according to claim 3, wherein the direction detecting means comprises:

a pattern judging means that judges a type of the servo pattern area; and a direction determining means that detects the direction of the relative movement in the radial direction between the position on the optical recording medium and the beam spot focused by the objective lens according to a result of the judgment by the pattern judging means.

5. The eccentricity amount detecting device according to claim 3, wherein the pattern counting means performs addition or subtraction with respect to a number of the changes of the servo pattern areas according to a result of the detection by the direction detecting means and outputs the count value.

6. The eccentricity amount detecting device according to claim 3, wherein the eccentricity amount computing means multiplies the count value from the pattern counting means by a value corresponding to the number of tracks included in one servo pattern area, thereby determining the eccentricity amount.

7. An eccentricity amount detecting device using an optical recording medium in which a plurality (N) of servo areas each including a clock mark, a first wobble mark and a second wobble mark, and a plurality (N) of data areas for performing information recording and reproduction are arranged alternately in a circumferential direction, each of the Servo areas being composed of a plurality of servo pattern areas arranged in a radial direction, which vary in a distance in the circumferential direction between the clock mark and the first wobble mark, and a distance in the circumferential direction between the clock mark and the second wobble mark, the plurality of servo pattern areas including the same number of tracks, the number being less than $N/(2\times\pi)$ ($\pi$ indicates a ratio of circumference to diameter), the device comprising:

a sensor that detects reflected light from the optical recording medium;

a direction detecting means that detects a direction of a relative movement in the radial direction between a position on the optical recording medium and a beam spot focused by an objective lens based on a detection signal from the sensor and outputs a result thus obtained as a direction detection signal;

a pattern counting means that counts changes of the servo pattern areas based on the detection signal from the sensor and the direction detection signal from the direction detecting means; and an eccentricity amount computing means that determines and eccentricity amount based on a count value from the pattern counting means.

8. The eccentricity amount detecting device according to claim 7, wherein the direction detecting means comprises:

a pattern judging means that judges a type of the servo pattern area; and a direction determining means that detects the direction of the relative movement in the radial direction between the position on the optical recording medium and the beam spot focused by the objective lens according to a result of the judgment by the pattern judging means.

9. The eccentricity amount detecting device according to claim 7, wherein the pattern counting means performs addition or subtraction with respect to a number of the changes of the servo pattern areas according to a result of the detection by the direction detecting means and outputs the count value.

10. The eccentricity amount detecting device according to claim 7,
wherein the eccentricity amount computing means multiplies the count value from the pattern counting means by a value corresponding to the number of tracks included in one servo pattern area, thereby determining the eccentricity amount.

11. An eccentricity amount detecting device using an optical recording medium in which a plurality (N) of servo areas each including a first wobble mark and a second wobble mark and plurality (N) of data areas for performing information recording and reproduction are arranged alternately in a circumferential direction, each of the servo areas being composed of a plurality of servo pattern areas arranged in a radial direction, which vary in a distance in the circumferential direction between the first wobble mark and the second wobble mark, the plurality of servo pattern areas including the same number of tracks, and the number being less than $N/(2\times\pi)$ ($\pi$ indicates a ratio of circumference to diameter), the device comprising:
a sensor that detects reflected light from the optical recording medium;
a direction detecting means that detects a direction of a relative movement in the radial direction between a position on the optical recording medium and a beam spot focused by an objective lens based on a detection signal from the sensor and outputs a result thus obtained as a direction detection signal;
a pattern counting means that counts changes of the servo pattern areas based on the detection signal from the sensor and the direction detection signal from the direction detecting means; and
an eccentricity amount computing means that determines and eccentricity amount based on a count value from the pattern counting means.

12. The eccentricity amount detecting device according to claim 11,
wherein the direction detecting means comprises:
a pattern judging means that judges a type of the servo pattern area; and
a direction determining means that detects the direction of the relative movement in the radial direction between the position on the optical recording medium and the beam spot focused by the objective lens according to a result of the judgment by the pattern judging means.

13. The eccentricity amount detecting device according to claim 11,
wherein the pattern counting means performs addition or subtraction with respect to a number of the changes of the servo pattern areas according to a result of the detection by the direction detecting means and outputs the count value.

14. The eccentricity amount detecting device according to claim 11,
wherein the eccentricity amount computing means multiplies the count value from the pattern counting means by a value corresponding to the number of tracks included in one servo pattern area, thereby determining the eccentricity amount.

* * * * *